(12) United States Patent
Ohno et al.

(10) Patent No.: US 11,333,892 B2
(45) Date of Patent: May 17, 2022

(54) DISPLAY APPARATUS, DISPLAY SYSTEM, AND DISPLAY METHOD

(71) Applicant: Hitachi, Ltd., Tokyo (JP)

(72) Inventors: Chiyo Ohno, Tokyo (JP); Koji Yamasaki, Tokyo (JP); Takuya Nakamichi, Tokyo (JP); Yasuyuki Mimatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/197,560

(22) Filed: Mar. 10, 2021

(65) Prior Publication Data

US 2021/0333554 A1 Oct. 28, 2021

(30) Foreign Application Priority Data

Apr. 24, 2020 (JP) .............................. JP2020-077750
Nov. 25, 2020 (JP) .............................. JP2020-195388

(51) Int. Cl.
*G02B 27/01* (2006.01)
*G09G 3/20* (2006.01)
*G06F 3/0346* (2013.01)
*G06F 3/14* (2006.01)

(52) U.S. Cl.
CPC ....... *G02B 27/0172* (2013.01); *G06F 3/0346* (2013.01); *G06F 3/1431* (2013.01); *G09G 3/20* (2013.01); *G02B 2027/014* (2013.01); *G02B 2027/0198* (2013.01); *G09G 2370/06* (2013.01)

(58) Field of Classification Search
CPC ...... G06F 3/0346; G06F 3/1431; G06F 3/012; G06F 3/017; G06F 3/011; G02B 27/017; G02B 27/0172; G02B 2027/014; G02B 2027/0198; G06T 19/006
See application file for complete search history.

(56) References Cited

U.S. PATENT DOCUMENTS

| | | | |
|---|---|---|---|
| 2010/0218094 A1* | 8/2010 | Ofek | G06F 3/167 715/706 |
| 2013/0278631 A1* | 10/2013 | Border | G02C 5/143 345/633 |
| 2015/0146007 A1* | 5/2015 | Dusik | G06T 19/006 348/161 |
| 2016/0124499 A1* | 5/2016 | Shiu | G06F 3/011 715/778 |
| 2016/0291922 A1* | 10/2016 | Montgomerie | G09B 5/125 |
| 2018/0349367 A1* | 12/2018 | Soni | G06F 16/148 |
| 2019/0025909 A1* | 1/2019 | Mittal | G06F 3/017 |
| 2019/0155478 A1* | 5/2019 | Lim | G06F 3/0488 |

FOREIGN PATENT DOCUMENTS

JP  2019-101330 A  6/2019

OTHER PUBLICATIONS

Extended European Search Report issued in European Application No. 21162072.9 dated Sep. 1, 2021 (nine (9) pages).

* cited by examiner

*Primary Examiner* — Ryan A Lubit
(74) *Attorney, Agent, or Firm* — Crowell & Moring LLP

(57) ABSTRACT

A HMD includes a sensor for detecting an orientation of a main body, a display, and a field image display unit for displaying a first image in a predetermined first display region of the display and displaying a second image related to the first image in a second display region of the display on a screen of the display. The field image display unit determines the second display region on the screen of the display according to the orientation of the main body.

13 Claims, 41 Drawing Sheets

FIG. 4

| # | WORK TARGET PART | WORK CONTENT | RELATED DRAWING | COMPLETION F | COMPLETION DATE AND TIME |
|---|---|---|---|---|---|
| 1 | XXX | ###### | DRAWING 1 | YES | 20200409-134534 |
| 2 | YYY | ###### | DRAWING 2 | NO | N/A |
| ... | ... | ... | ... | ... | ... |

| # | WORK TARGET PART | WORK CONTENT | RELATED DRAWING | RELATED DRAWING COORDINATES | COMPLETION F | COMPLETION DATE AND TIME |
|---|---|---|---|---|---|---|
| 1 | XXX | ### | DRAWING 1 | (x7,y7),(x8,y9) | YES | 20200409-134534 |
| 2 | YYY | ### | DRAWING 2 | (x9,y9),(xA,yA) | NO | N/A |
| ... | ... | ... | ... | ... | ... | ... |

FIG. 30

| NUMBER | COORDINATES | SIZE |
|--------|-------------|------|
| 1 | (0, 0) | (a, b) |
| 2 | (a, 0) | (a, b) |
| 3 | (2a, 0) | (a, b) |
| 4 | (0, b) | (a, b) |
| 5 | (a, b) | (a, b) |
| 6 | (2a, b) | (a, b) |
| 7 | (0, 2b) | (a, b) |
| 8 | (a, 2b) | (a, b) |
| 9 | (2a, 2b) | (a, b) |

DISPLAY APPARATUS, DISPLAY SYSTEM, AND DISPLAY METHOD

BACKGROUND OF THE INVENTION

1. Field of the Invention

The present invention relates to a display apparatus, a display system, and a display method for displaying information for supporting work.

2. Description of the Related Art

In the production of products in factories (plants), inspections, and repairs of factory equipment, work may be performed while looking at work documents such as procedure manuals and drawings, but sometimes it is difficult to arrange a device such as a display for displaying the work documents near the work target. As a display apparatus that can be used in such cases, a see-through type head-mounted display apparatus (hereinafter, also referred to as HMD) that is attached to the operator's head and displays an image of the virtual space superimposed on the real space and smart glasses are attracting attention. If a see-through type HMD or the like is used, the operator does not need to hold the display apparatus at hand or go to see the display apparatus in a distance, and the work efficiency can be improved.

The display control in the HMD can be made easier to use by changing and configuring the display screen according to the state of the HMD and the operator, or display contents. For example, in a HMD described in JP 2019-101330 A, an image obtained by capturing an image of a virtual space with a virtual camera is generated according to the angle of the line of sight measured by the HMD, and is displayed together with an image that does not change according to the angle.

SUMMARY OF THE INVENTION

In the invention described in JP 2019-101330 A, for example, an image of a virtual space is displayed on a non-transparent HMD, and an image that gives the operator (HMD wearer) the feeling of entering the virtual space is generated. On the other hand, in HMDs that support on-site work such as factories, it is necessary to work while looking at the actual work target, tools, and the surroundings of the site in the real space, so the technology described in JP 2019-101330 A cannot be said to be suitable as a display apparatus for work on site.

The invention has been made in view of such a background, and an object of the invention is to provide a display apparatus, a display system, and a display method which are suitable for an operator working in a real space and capable of displaying information related to the work.

In order to solve the above-mentioned problems, a display apparatus according to the invention includes a detector that detects an orientation of a main unit, a display, and an image display processing unit that displays a first image in a predetermined first display region on a screen of the display, and displays a second image related to the first image in a second display region on the screen of the display. The image display processing unit determines the second display region on the screen of the display according to the orientation of the main body.

According to the invention, it is possible to provide a display apparatus, a display system, and a display method suitable for an operator working in a real space and capable of displaying information related to the work. Objects, configurations, and effects besides the above description will be apparent through the explanation on the following embodiments.

BRIEF DESCRIPTION OF THE DRAWINGS

FIG. 4 is a data structure diagram of a work manual database according to the first embodiment;

FIG. 17 is a data structure diagram of a work manual database according to a third embodiment;

FIG. 30 is a data structure of a layout region table stored in the HMD according to the fifth embodiment;

DESCRIPTION OF THE PREFERRED EMBODIMENTS

Figure 1:
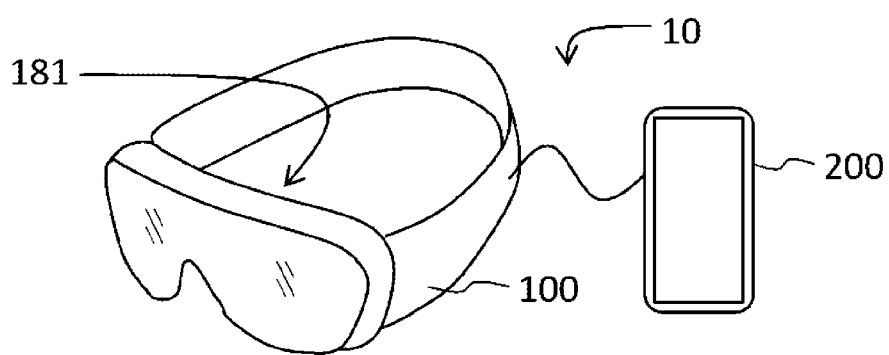
FIG. 1 is a diagram illustrating the configuration of a display system according to a first embodiment.

Hereinafter, a display system according to modes (embodiments) for carrying out the invention will be described.

The display system includes a smartphone and a transparent HMD. A work procedure manual and drawings are stored in the smartphone, and an image (also referred to as a display source image) containing the procedure manual and drawings of the work steps performed by the operator in their predetermined regions respectively is generated and sent to the HMD. The HMD cuts out an image from the region of the procedure manual included in the display source image and displays it at a predetermined position (for example, lower center) on the screen of the HMD.

In addition, the HMD displays the drawing according to the orientation of the main body. For example, it is assumed that the drawing region is on the right side of the display source image (see a drawing layout region 232 in a display source image 230 of FIG. 5 described later). The HMD will then not display the drawing when the operator is facing the front. The HMD displays the left side of the drawing on the right side of the screen when it detects that the operator has turned slightly to the right, and displays the entire drawing on the right side of the screen when it detects that the operator has turned significantly to the right.

In this way, the operator can work while always referring to the procedure manual by displaying the procedure manual and the drawing by the HMD. Also, the operator can refer to the drawing by turning to the right. When the operator faces the front, the drawing is not displayed, and the view of the operator looking at the work object or the work site is not obstructed. As a result, the operator can work with both hands while referring to the procedure manual and drawings without operating the smartphone or the HMD by hand.

First Embodiment: Overall Configuration of Display System

FIG. 1 is a diagram illustrating the configuration of a display system 10 according to the first embodiment. The display system 10 includes an HMD (head-mounted display) 100 (display apparatus) and a smartphone 200 (portable device). The HMD 100 is, for example, a goggle-type display apparatus worn on the head so as to cover the field of view. The HMD 100 and the smartphone 200 are connected by, for example, a USB (Universal Serial Bus) cable, but may be connected by a cable of another standard or wirelessly. Alternatively, a USB may be connected to the smartphone 200, converted to an image output connector such as HDMI (High-Definition Multimedia Interface) or a display port via a conversion adapter, and connected to the HMD 100. The HMD 100 also includes smart glasses that are used like glasses. Similarly, the smartphone 200 (portable device) includes portable terminals such as tablets and notebook PCs.

First Embodiment: Configuration of HMD (Head-Mounted Display)

Figure 2:
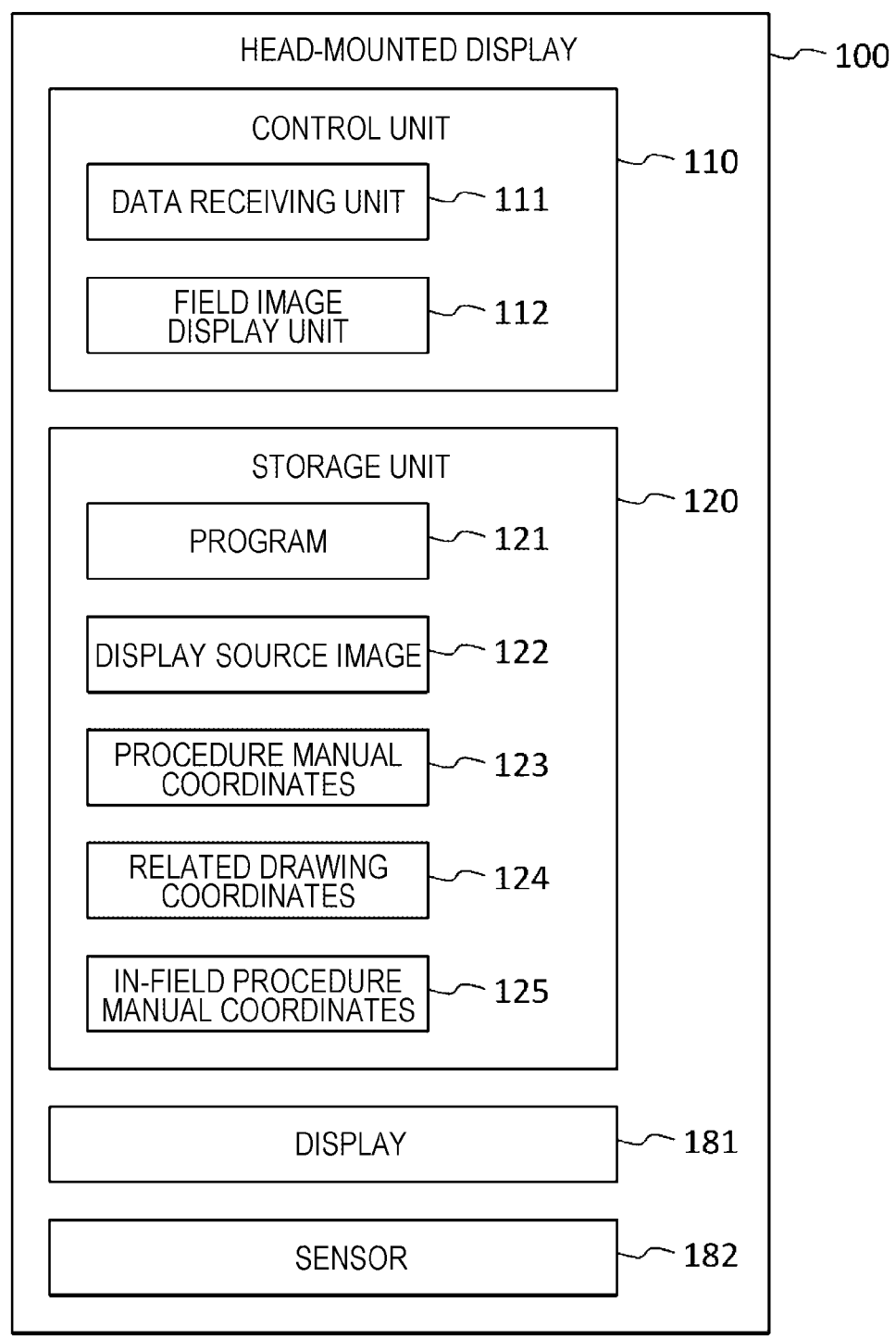
FIG. 2 is a functional block diagram of an HMD according to the first embodiment.

FIG. 2 is a functional block diagram of the HMD 100 according to the first embodiment. The HMD 100 is configured by a control unit 110 including a CPU (Central Processing Unit), a storage unit 120 including ROM (Read Only Memory), RAM (Random Access Memory), and flash memory, a display 181, a sensor 182, and a communication unit (not illustrated). The communication unit includes one or more communication interfaces such as USB and Wi-Fi (registered trademark), and sends and receives data to and from the smartphone 200.

The display 181 is a transmissive display apparatus having a high transmittance provided at the front of the HMD 100 (see FIG. 1). In addition to the binocular type as illustrated in FIG. 1, a monocular type used with either the left or right eye may be used. The operator can work while wearing the HMD 100 and referring to the information displayed on the display 181.

The sensor 182 is, for example, a sensor including a MEMS (Micro Electro Mechanical Systems) type gyroscope, which detects the angle or angular speed of the HMD 100 and outputs it to the control unit 110. There may be included an illuminance sensor that measures the ambient illuminance and a camera that captures images of the surroundings and the operator.

The storage unit 120 stores a program 121, a display source image 122, a procedure manual coordinates 123, a related drawing coordinates 124, and an in-field procedure manual coordinates 125. The program 121 is a program executed by the CPU included in the control unit 110, and controls the HMD 100. The program 121 includes other processing procedures other than the field image display process (see FIG. 9 described later).

The display source image 122 is a display source image 230 (see FIGS. 3 and 5 described later) received from the smartphone 200, and is image data that is the source of the field image displayed on the display 181. The procedure manual coordinates 123, the related drawing coordinates 124, and the in-field procedure manual coordinates 125 are coordinates data indicating a region in the display source image 122 received from the smartphone 200, and are equivalent to a procedure manual coordinates 222, a related drawing coordinates 223, and an in-field procedure manual coordinates 224, respectively which are stored in the smartphone 200 (see FIG. 3) described later.

The control unit 110 includes a data receiving unit 111 and a field image display unit 112. The data receiving unit 111 stores the data received from the smartphone 200 in the display source image 122, the procedure manual coordinates 123, the related drawing coordinates 124, and the in-field procedure manual coordinates 125. The field image display unit 112 cuts out an image from the display source image 122 (the display source image 230 described in FIG. 5 described later) with reference to the procedure manual coordinates 123, the related drawing coordinates 124, and the in-field procedure manual coordinates 125 and displays it on the display 181.

First Embodiment: Configuration of Smartphone

Figure 3:
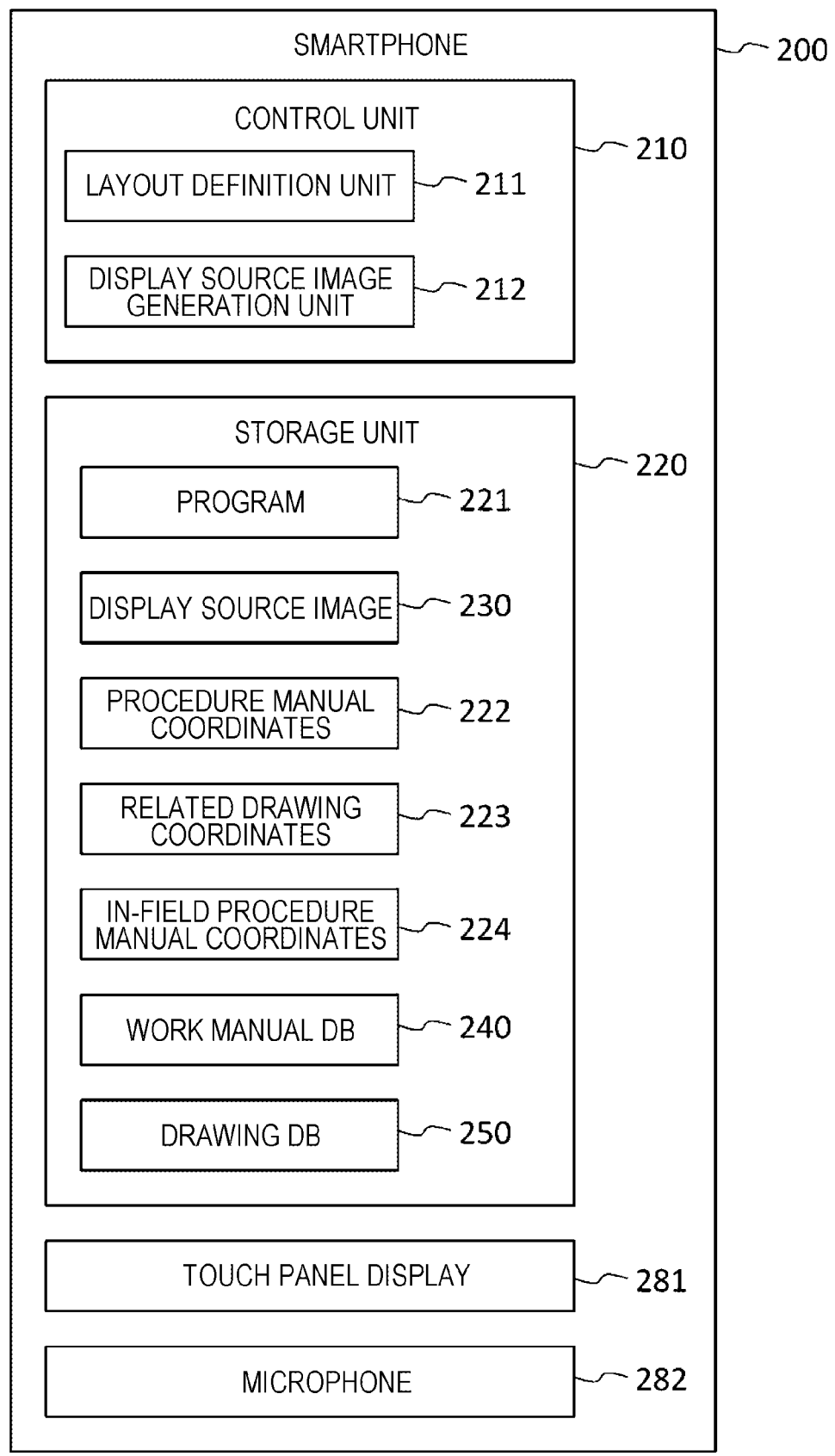
FIG. 3 is a functional block diagram of a smartphone according to the first embodiment.

FIG. 3 is a functional block diagram of the smartphone 200 according to the first embodiment. The smartphone 200 includes a control unit 210 including a CPU, a storage unit 220 configured by ROM, RAM, flash memory, etc., a touch panel display 281, a microphone 282, and a communication unit (not illustrated). The communication unit includes one or more communication interfaces such as USB and Wi-Fi, and sends and receives data to and from the HMD 100.

In the storage unit 220, a program 221, the display source image 230, the procedure manual coordinates 222, the related drawing coordinates 223, the in-field procedure manual coordinates 224, and a work manual database 240 (referred to as a work manual DB (database) in FIG. 3; see FIG. 4 described later) and a drawing database 250 (referred to as drawing DB in FIG. 3) are stored.

The program 221 is a program executed by the CPU included in the control unit 210, and controls the smartphone 200. The program 221 includes other processing procedures other than the display source image generation process (see FIG. 8 described later).

FIG. 4 is a data structure diagram of the work manual database 240 according to the first embodiment. The work manual database 240 is, for example, tabular data. One line in the work manual database 240 indicates one work step executed by the operator who is a user of the display system 10, and includes a step number 241 (indicated as # in FIG. 4), a work target part 242, a work content 243, a related drawing 244, a completion flag 245 (denoted as completion F in FIG. 4), and a completion date and time 246.

The step number 241 is a number assigned to the work step and indicates the order of the work steps. The work target part 242 indicates a part to be the target of work such as repair or inspection, and is, for example, the name of the work target "No. 1 of Model A". The work content 243 is a description of the work step displayed on the display 181 (see FIGS. 1 and 2), and is, for example, a description of the work content of "turning off the switch B". The related drawing 244 is a drawing related to the work step, and is identification information of the drawing displayed on the display 181. The completion flag 245 indicates whether the work step has been completed ("YES") or has not been completed ("NO"). The completion date and time 246 is the date and time when the work step has been completed.

Returning to FIG. 3, the drawing database 250 stores a drawing related to work step.

The identification information corresponding to the related drawing 244 (see FIG. 4) is assigned to the drawing, and the control unit 210 can access the drawing by designating the identification information. The display source image 230, the procedure manual coordinates 222, the related drawing coordinates 223, and the in-field procedure manual coordinates 224 will be described with reference to FIGS. 5 and 6 described later.

First Embodiment: Display Source Image and Field Image

Figure 5:
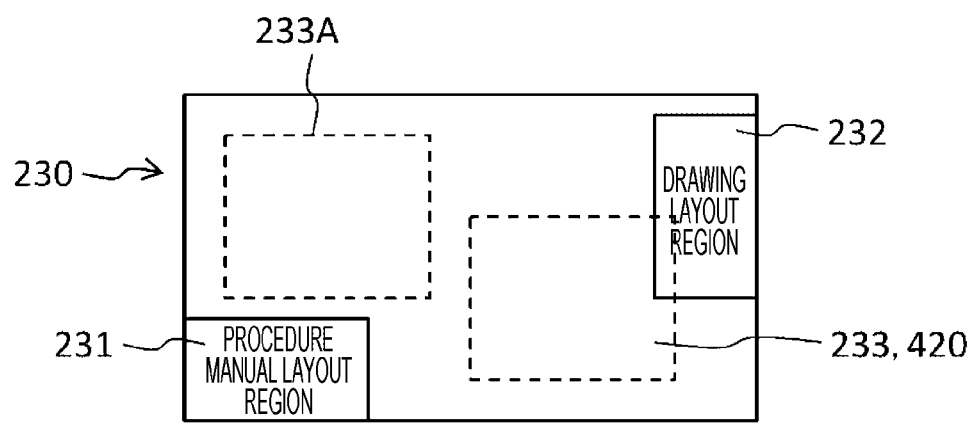
FIG. 5 is a diagram illustrating the configuration of a display source image according to the first embodiment.

FIG. 5 is a diagram illustrating the configuration of the display source image 230 according to the first embodiment. The display source image 230 is image data that is the source of the image displayed on the display 181 (see FIGS. 1 and 2). A procedure manual layout region 231 is a region in which the contents of the procedure manual (the step number 241, the work target part 242, the work content 243, the related drawings 244, and the completion flag 245 in FIG. 4) are displayed in the display source image 230. The drawing layout region 232 is a region in which the drawing related to the procedure manual (a drawing identified in the related drawing 244 of FIG. 4 and stored in the drawing database 250) is displayed in the display source image 230.

A field region 233 is a partial region of the display source image 230 and is a region displayed on the display 181 (see FIGS. 1 and 2), and the size of the region is the display size of the display 181. The field region 233 moves in the display source image 230 according to the orientation of the HMD 100. For example, when the operator turns to the left and the sensor 182 (see FIG. 2) detects the counterclockwise rotation of the HMD 100, the display 181 displays a field region 233A on the left side of the display source image 230.

The procedure manual coordinates 222 (see FIG. 3) is the layout coordinates of the procedure manual layout region 231 in the display source image 230. The layout coordinates is, for example, the coordinates of the upper left vertex and the lower right vertex of the region in the display source image 230. The layout coordinates may be the coordinates of the upper left vertex of the region and the size of the region. The related drawing coordinates 223 is the layout coordinates of the drawing layout region 232 in the display source image 230.

Figure 6:
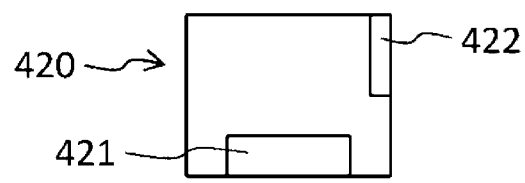
FIG. 6 is a diagram illustrating the configuration of a field image displayed on a display according to the first embodiment.

FIG. 6 is a diagram illustrating the configuration of a field image 420 displayed on the display 181 according to the first embodiment. The field image 420 is an image corresponding to the field region 233 (see FIG. 5), and is an image obtained by cutting out an in-field drawing region 422 (described later) from the display source image 230 and adding an in-field procedure manual region 421. In the display 181, pixels are not displayed in a part other than the in-field drawing region 422 and the in-field procedure manual region 421, so that the operator wearing the HMD 100 can see the scenery of the work place through the part of the field of view.

The in-field procedure manual region 421 is a partial region of the field image 420 and is a region in which the procedure manual is displayed. In the first embodiment, the in-field procedure manual region 421 is arranged below the center of the field image 420, but may be arranged at another position. The in-field procedure manual coordinates 224 (see FIG. 3) are the layout coordinates of the in-field procedure manual region 421 in the field image 420.

The in-field drawing region 422 is a region in which the field region 233 (see FIG. 5) and the drawing layout region 232 overlap, and is a region including a part of the drawing. Since the field region 233 moves in the display source image 230 according to the orientation of the HMD 100, the in-field drawing region 422, which is a region where the field region 233 and the drawing layout region 232 overlap, also changes according to the orientation of the HMD 100. For example, when the operator turns to the left, the operator moves from the field region 233 to the field region 233A. Then, since the field region 233A and the drawing layout region 232 do not overlap, the in-field drawing region 422 does not exist, and the drawing is not displayed on the display 181.

First Embodiment: Configuration of Smartphone: Control Unit

Returning to FIG. 3, the control unit 210 includes a layout definition unit 211 and a display source image generation unit 212. The layout definition unit 211 receives an instruction of the operator who is the user of the display system 10, and defines (sets) the layout of the procedure manual layout region 231 and the drawing layout region 232 (layout coordinates) in the display source image 230 (see FIG. 5), and the layout of the in-field procedure manual region 421 in the field image 420 (see FIG. 6). The layout definition unit 211 transmits the defined layout coordinates to the HMD 100. The display source image generation unit 212 generates the display source image 230 including a procedure manual and a related drawing related to the work step in which the operator is working, and transmits the display source image 230 to the HMD 100.

First Embodiment: Layout Definition Process

Figure 7:
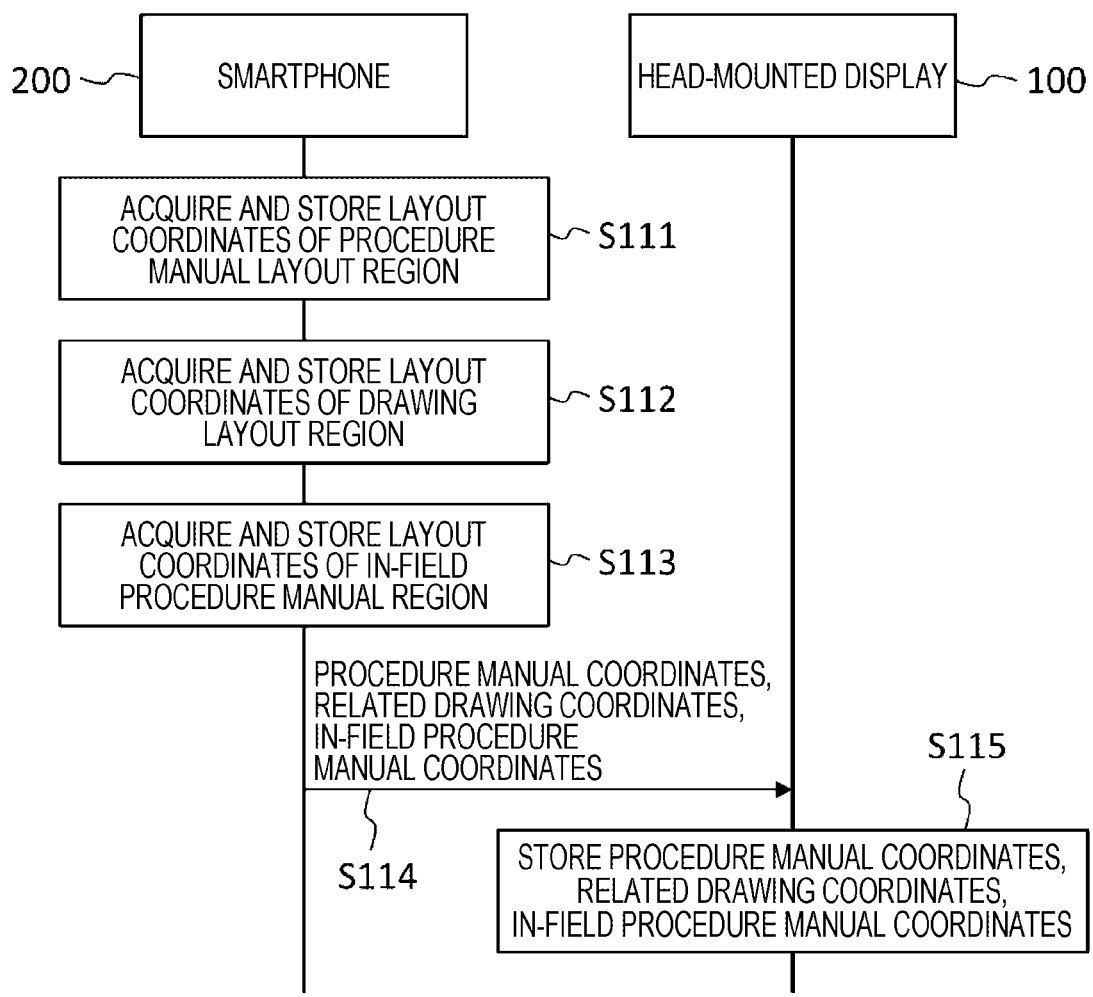
FIG. 7 is a sequence diagram of a layout definition process according to the first embodiment.

FIG. 7 is a sequence diagram of the layout definition process according to the first embodiment. The process of the smartphone 200 and the HMD 100 for setting the display source image 230 (see FIG. 5) and the field image 420 (see FIG. 6) will be described with reference to FIG. 7.

In Step S111, the layout definition unit 211 of the smartphone 200 acquires the layout coordinates of the procedure manual layout region 231 in the display source image 230 (see FIG. 5) instructed by the operator who is the user of the display system 10, and stores the layout coordinates in the procedure manual coordinates 222 (see FIG. 3). The layout coordinates are, for example, the coordinates of the upper left vertex and the lower right vertex of the region in the display source image 230.

In Step S112, the layout definition unit 211 acquires the layout coordinates of the drawing layout region 232 in the display source image 230 instructed by the operator, and stores the layout coordinates in the related drawing coordinates 223.

In Step S113, the layout definition unit 211 acquires the layout coordinates of the in-field procedure manual region 421 in the field image 420 (see FIG. 6) instructed by the operator, and stores the layout coordinates in the in-field procedure manual coordinates 224.

In Step S114, the layout definition unit 211 transmits the procedure manual coordinates 222, the related drawing coordinates 223, and the in-field procedure manual coordinates 224 to the HMD 100.

In Step S115, the data receiving unit 111 of the HMD 100 stores the received procedure manual coordinates 222, related drawing coordinates 223, and in-field procedure manual coordinates 224, which are received, in the procedure manual coordinates 123, the related drawing coordinates 124, and the in-field procedure manual coordinates 125, respectively.

Following the layout definition process, the process of the display system 10 when the operator works using the display system 10 will be described.

First Embodiment: Display Source Image Generation Process

Figure 8:
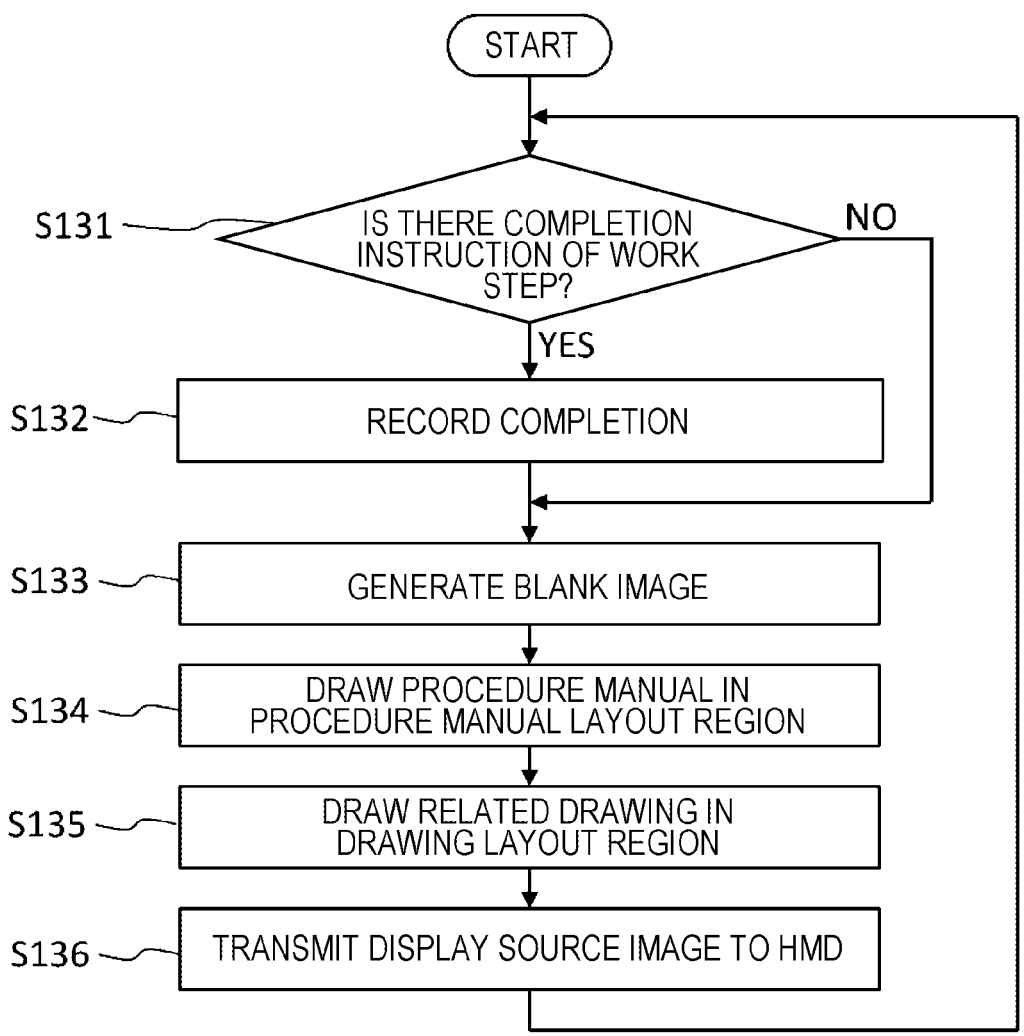
FIG. 8 is a flowchart of a display source image generation process according to the first embodiment.

FIG. 8 is a flowchart of the display source image generation process according to the first embodiment. A process in which the smartphone 200 generates the display source image 230 and transmits it to the HMD 100 will be described with reference to FIG. 8.

In Step S131, the display source image generation unit 212 of the smartphone 200 proceeds to Step S132 if there is an instruction to complete the work step (Step S131→YES), and proceeds to Step S133 if not (Step S131→NO). The completion instruction of the work step is to instruct the display system 10 that the operator records the completion of one work step. The display source image generation unit 212 may determine whether there is a completion instruction of the work step by detecting the operator's utterance of "work step completed" from the sound acquired by the microphone 282 (see FIG. 3). Alternatively, the display source image generation unit 212 may determine that there is a completion instruction of the work step by detecting an operator's tap of the completion button of the work step displayed in the touch panel display 281.

In Step S132, the display source image generation unit 212 records the completion of the work step. Specifically, the display source image generation unit 212 updates the completion flag 245 (see FIG. 4) of the current work step to "YES" and the completion date and time 246 to the current time. The current work step is the work step in which the completion flag 245 is "NO" and the step number 241 is the smallest.

In Step S133, the display source image generation unit 212 generates a blank image and stores it in the display source image 230.

In Step S134, the display source image generation unit 212 draws the procedure manual in the procedure manual layout region 231 (see FIG. 5) of the display source image 230. Specifically, the display source image generation unit 212 draws the step number 241, the work target part 242, the work content 243, the related drawing 244, and the completion flag 245 (see FIG. 4) of the current work step in the procedure manual layout region 231.

In Step S135, the display source image generation unit 212 draws the related drawing in the drawing layout region 232 of the display source image 230. Specifically, the display source image generation unit 212 acquires the drawing corresponding to the identification information in the related drawing 244 of the current work step from the drawing database 250, and draws it in the drawing layout region 232.

In Step S136, the display source image generation unit 212 transmits the display source image 230 to the HMD 100, and returns to Step S131.

First Embodiment: Field Image Display Process

Figure 9:
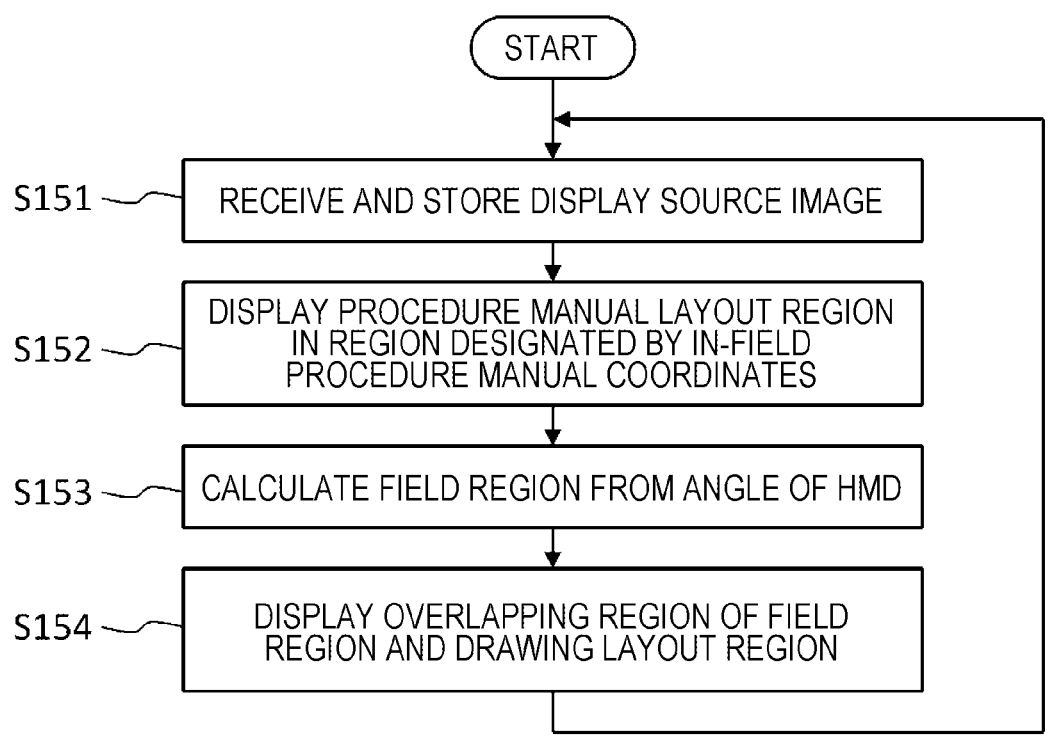
FIG. 9 is a flowchart of a field image display process according to the first embodiment.

FIG. 9 is a flowchart of the field image display process according to the first embodiment. A process of displaying a field image on the display 181 will be described based on the display source image 230 (see Step S136 in FIG. 8) received by the HMD 100 from the smartphone 200 with reference to FIG. 9.

In Step S151, the data receiving unit 111 of the HMD 100 receives the display source image 230 transmitted by the smartphone 200 and stores it in the display source image 122.

In Step S152, the field image display unit 112 of the HMD 100 displays an image of the procedure manual layout region 231 (see FIG. 5, a partial region of the display source image 122 indicated by the procedure manual coordinates 123) in the region (see the in-field procedure manual region 421 of FIG. 6) of the display 181 indicated by the in-field procedure manual coordinates 125.

In Step S153, the field image display unit 112 calculates the field region 233 (see FIG. 5) from the orientation (angle) of the HMD 100 acquired by the sensor 182.

In Step S154, the field image display unit 112 displays the overlapping region of the field region 233 (see FIG. 5) and the drawing layout region 232 in the corresponding region of the display 181, and returns to Step S151. The corresponding region of the display 181 is a region corresponding to the in-field drawing region 422 in the field image 420 when the display image of the display 181 is regarded as the field image 420 (see FIG. 6).

First Embodiment: Features of Display System

The display 181 of the HMD 100 displays a procedure manual and a related drawing of the work step in which the operator is working. The procedure manual is always displayed at the set position on the display 181 (see the in-field procedure manual region 421 in FIG. 6). Therefore, the operator can work while always referring to the procedure manual.

The related drawing is displayed according to the orientation of the operator's head (HMD 100). It is assumed that the position of the drawing is set on the right side of the display source image 230. Then, when the operator is facing the front, the drawing is not displayed, and the operator can work without being disturbed by the drawing. The operator can refer to the drawing by turning to the right. As a result, the operator can refer to the procedure manual and drawing while working with both hands without operating the smartphone 200 or the HMD 100 by hand.

Second Embodiment

In the first embodiment, the procedure manual is always displayed in the in-field procedure manual region 421 in the field image 420 (see FIG. 6), but the display/non-display may be switched according to the instruction of the operator. Further, although the display region of the procedure manual is fixed to the lower center side (see the in-field procedure manual region 421 in FIG. 6), the display/non-display or the display position may be switched according to the instruction of the operator. Regarding the drawing in the display source image 230, a background color may be specified and the pixels other than the background color may be used as the drawing without specifying a drawing using the drawing layout region 232 specified with the coordinates. Hereinafter, a second embodiment that enables display/non-display of the procedure manual, switching of the display position, and designation of the background color will be described. As in the procedure manual, the display/non-display of the drawing may be switched according to the instruction of the operator.

Second Embodiment: Configuration of HMD

Figure 10:
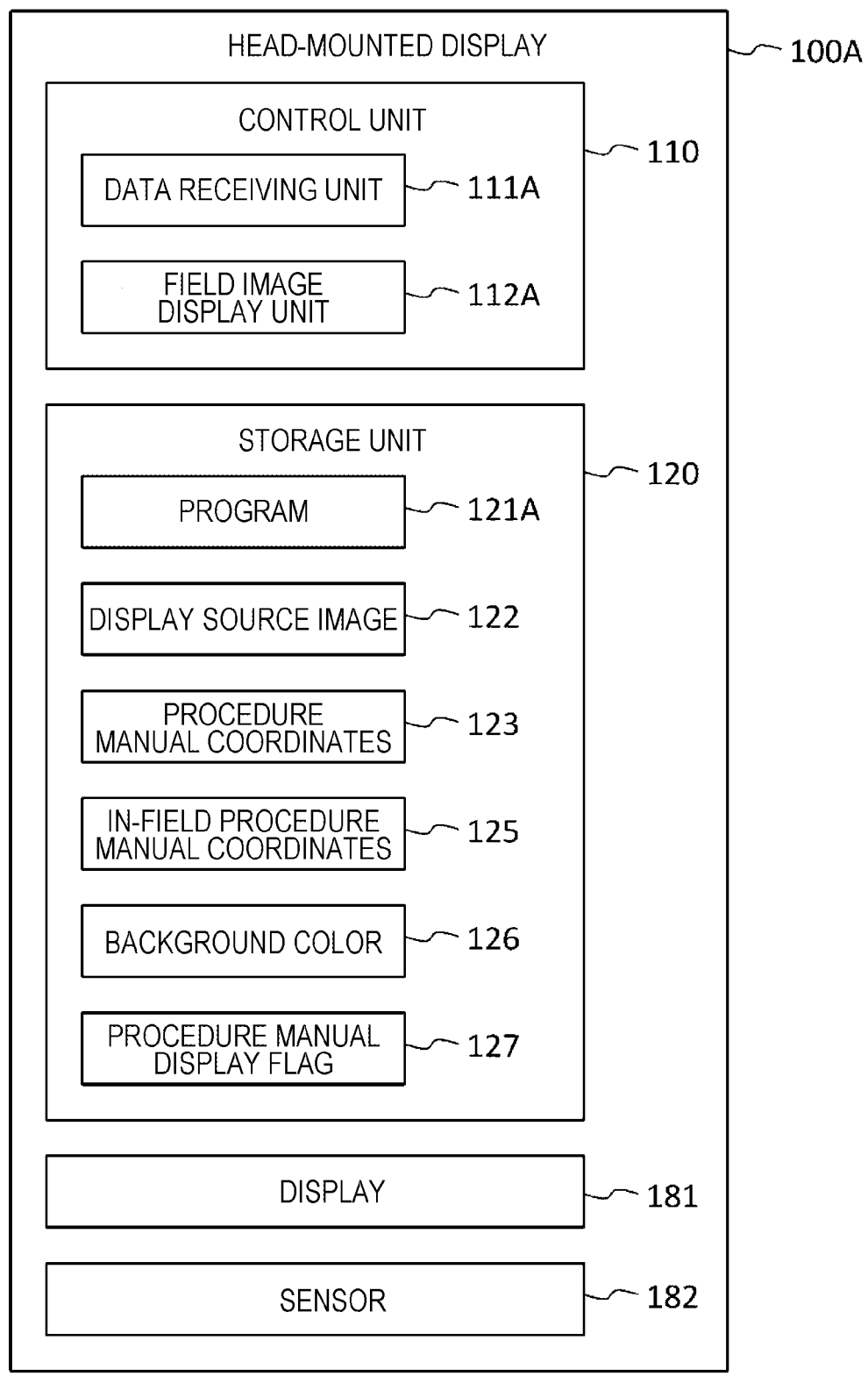
FIG. 10 is a functional block diagram of the HMD according to a second embodiment.

FIG. 10 is a functional block diagram of a HMD 100A according to the second embodiment. Compared to the HMD 100 of the first embodiment (see FIG. 2), the storage unit 120 eliminates the related drawing coordinates 124, and adds a background color 126 and a procedure manual display flag 127. The background color 126 is a color that is the background of the drawing, and the pixels of colors other than the background color 126 in the display source image 122 are the drawing. The procedure manual display flag 127 is a flag indicating whether to display the procedure manual on the display 181. A data receiving unit 111A receives the background color and the procedure manual display flag from the smartphone 200 in addition to the display source image and the procedure manual coordinates, and stores them in the storage unit 120.

The field image display unit 112A displays the procedure manual and the drawing on the display 181 with reference to the background color 126 and the procedure manual display flag 127.

Second Embodiment: Configuration of Smartphone

Figure 11:
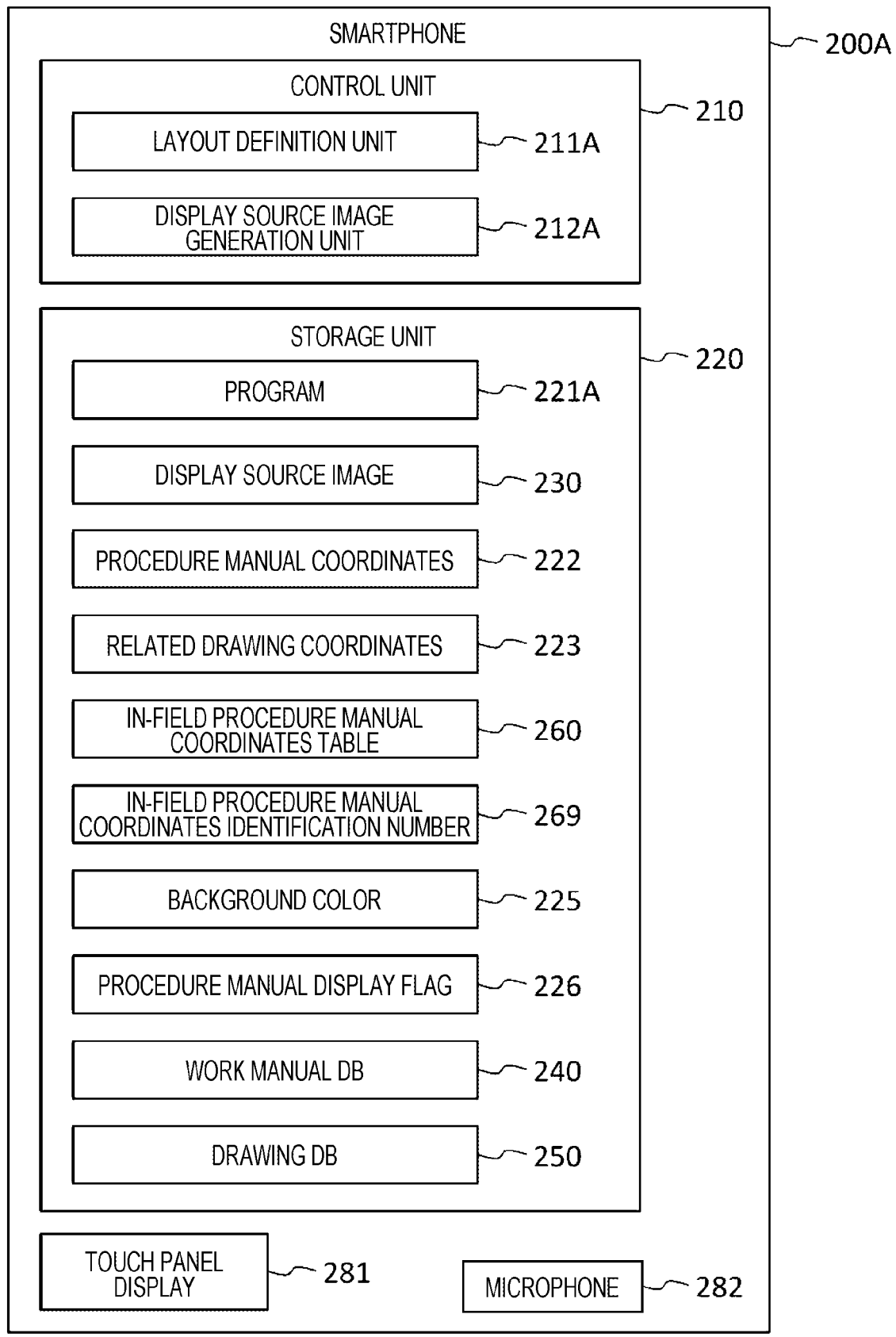
FIG. 11 is a functional block diagram of a smartphone according to the second embodiment.

FIG. 11 is a functional block diagram of a smartphone 200A according to the second embodiment. Compared to the smartphone 200 of the first embodiment, an in-field procedure manual coordinates table 260 (see FIG. 12 described later) and an in-field procedure manual coordinates identification number 269 are stored in the storage unit 220 instead of the in-field procedure manual coordinates 224. In addition, the background color 126, a background color 225 corresponding to the procedure manual display flag 127, and a procedure manual display flag 226 are added.

Figure 12:
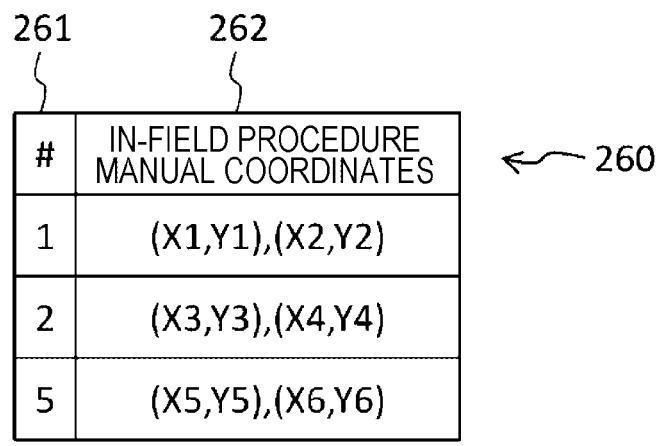
FIG. 12 is a data structure diagram of an in-field procedure manual coordinates table according to the second embodiment.

FIG. 12 is a data structure diagram of the in-field procedure manual coordinates table 260 according to the second embodiment. The in-field procedure manual coordinates table 260 stores the layout coordinates of one or more in-field procedure manual regions 421 (see FIG. 6). The in-field procedure manual coordinates table 260 is, for example, tabular data, in which one row (record) indicates one in-field procedure manual coordinates, and columns (attributes) of an in-field procedure manual coordinates identification number 261 (denoted as # in FIG. 12) and an in-field procedure manual coordinates 262 are included. The in-field procedure manual coordinates identification number 261 is identification information of the in-field procedure manual coordinates. The in-field procedure manual coordinates 262 indicates the layout coordinates of the in-field procedure manual region 421. The in-field procedure manual coordinates identification number 269 (see FIG. 11) is the in-field procedure manual coordinates identification number 261 of the in-field procedure manual region 421 (see FIG. 6) specified by the operator.

Returning to FIG. 11, a layout definition unit 211A receives the instruction of the operator and defines the layout of the procedure manual layout region 231 and the background color 225. A display source image generation unit 212A generates a display source image 230 including a procedure manual and a related drawing, and transmits the display source image 230 to the HMD 100A.

Second Embodiment: Layout Definition Process

Figure 13:
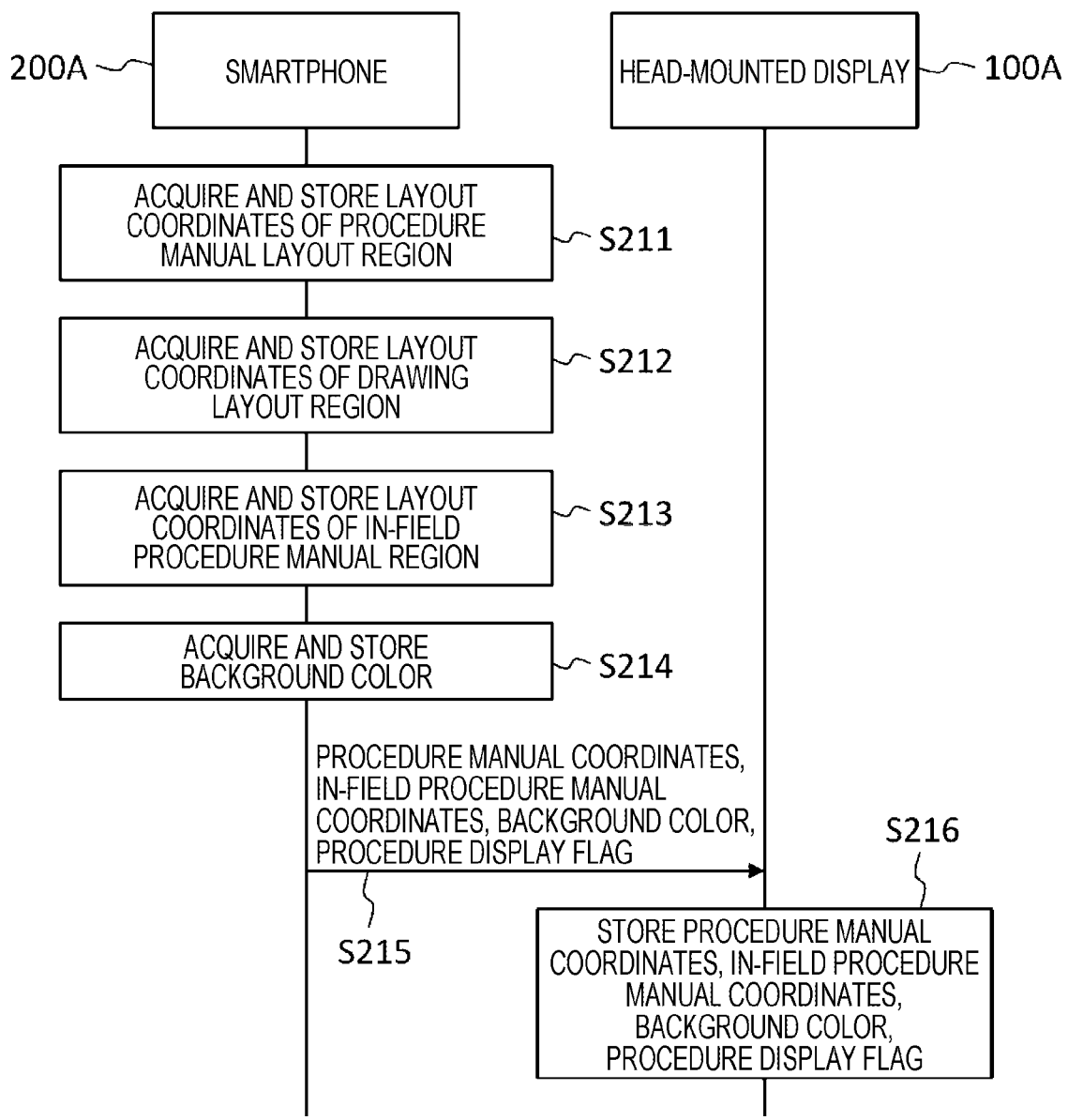
FIG. 13 is a sequence diagram (1) of the layout definition process according to the second embodiment.
Figure 14:
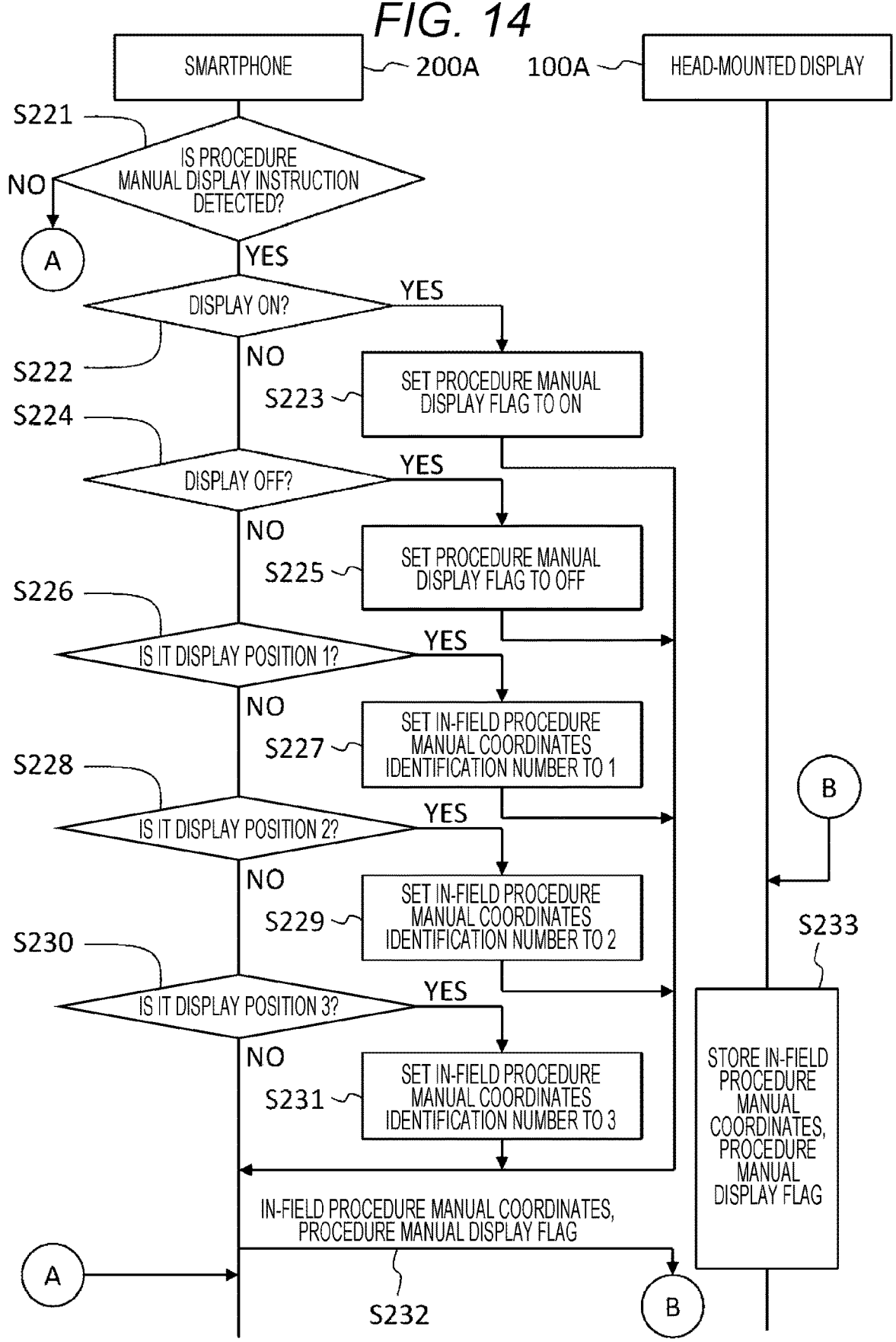
FIG. 14 is a sequence diagram (2) of the layout definition process according to the second embodiment.

FIG. 13 is a sequence diagram (1) of the layout definition process according to the second embodiment. FIG. 14 is a sequence diagram (2) of the layout definition process according to the second embodiment. In the second embodiment, in the layout definition process, following the process of FIG. 13, the process of FIG. 14 is repeatedly executed during the work.

In Step S211, the layout definition unit 211A of the smartphone 200A acquires the layout coordinates of the procedure manual layout region 231 in the display source image 230 (see FIG. 5) instructed by the operator who is the user of the display system 10, and stores the layout coordinates in the procedure manual coordinates 222.

In Step S212, the layout definition unit 211A acquires the layout coordinates of the drawing layout region 232 in the display source image 230 instructed by the operator, and stores the layout coordinates in the related drawing coordinates 223.

In Step S213, the layout definition unit 211A acquires the layout coordinates of the in-field procedure manual region 421 in the field image 420 (see FIG. 6) instructed by the operator, and stores the layout coordinates in the in-field procedure manual coordinates table 260 (see FIG. 12). The in-field procedure manual region 421 is not limited to one, and may be multiple. In the second embodiment, the description will be given about a case where the operator indicates three procedure manual layout regions (see FIG. 12). The layout definition unit 211A stores "1" as a default in-field procedure manual coordinates identification number in the in-field procedure manual coordinates identification number 269 and "ON" as a default procedure manual display flag in the procedure manual display flag 226. The layout definition unit 211A may inquire of the operator for the default in-field procedure manual coordinates identification number and the procedure manual display flag, and may store them in the in-field procedure manual coordinates identification number 269 and the procedure manual display flag 226.

In Step S214, the layout definition unit 211A acquires the background color of the drawing instructed by the operator and stores it in the background color 225.

In Step S215, the layout definition unit 211A transmits the procedure manual coordinates 222, the in-field procedure manual coordinates 262 (see FIG. 12) corresponding to the in-field procedure manual coordinates identification number 269, the background color 225, and the procedure manual display flag 226 to HMD 100A.

In Step S216, the data receiving unit 111A of the HMD 100A stores the procedure manual coordinates 222, the in-field procedure manual coordinates 262 corresponding to the in-field procedure manual coordinates identification number 269, the background color 225, and the procedure manual display flag 226, which are received, in the procedure manual coordinates 123, the in-field procedure manual coordinates 125, the background color 126, and the procedure manual display flag 127, respectively.

Moving to FIG. 14, in Step S221, the layout definition unit 211A proceeds to Step S222 if there is an instruction related to the procedure manual display (Step S221→YES), and returns to Step S221 if not (Step S221→NO). The instruction related to the procedure manual display is an instruction of whether the display of the procedure manual is correct and the display position. For example, the operator utters "display procedure manual" or "display procedure manual ON" to give an instruction of the display of the procedure manual. In addition, the operator utters "display procedure manual position No. 2" or "display procedure manual at position No. 2" to indicate the display position of the procedure manual. The layout definition unit 211A may determine whether there is an instruction from the sound acquired by the microphone 282. Alternatively, the layout definition unit 211A may determine whether there is an instruction by detecting an operator's tap of the procedure manual display ON/OFF button or the procedure manual display position button displayed on the touch panel display 281.

In Step S222, the layout definition unit 211A proceeds to Step S223 if the instruction in Step S221 is an instruction to display the procedure manual (Step S222→YES), and proceeds to Step S224 if it is not an instruction to display (Step S222→NO).

In Step S223, the layout definition unit 211A sets the procedure manual display flag 226 (see FIG. 11) to "ON".

In Step S224, the layout definition unit 211A proceeds to Step S225 if the instruction in Step S221 is an instruction not to display the procedure manual (Step S224→YES), and proceeds to Step S226 if it is not an instruction not to display (Step S224→NO).

In Step S225, the layout definition unit 211A sets the procedure manual display flag 226 to "OFF".

In Step S226, the layout definition unit 211A proceeds to Step S227 if the instruction in Step S221 is an instruction to set the display position of the procedure manual to No. 1 (Step S226→YES), and proceeds to Step S228 if it is not an instruction to set it to No. 1 (Step S226→NO).

In Step S227, the layout definition unit 211A sets the in-field procedure manual coordinates identification number 269 to "1".

In Step S228, the layout definition unit 211A proceeds to Step S229 if the instruction in Step S221 is an instruction to set the display position of the procedure manual to No. 2 (Step S228→YES), and proceeds to Step S230 if it is not an instruction to set it to No. 2 (Step S228→NO).

In Step S229, the layout definition unit 211A sets the in-field procedure manual coordinates identification number 269 to "2".

In Step S230, the layout definition unit 211A proceeds to Step S231 if the instruction in Step S221 is an instruction to set the display position of the procedure manual to No. 3 (Step S230→YES), and proceeds to Step S232 if it is not an instruction to set it to No. 3 (Step S230→NO).

In Step S231, the layout definition unit 211A sets the in-field procedure manual coordinates identification number 269 to "3".

In Step S232, the layout definition unit 211A transmits the in-field procedure manual coordinates 262 corresponding to the in-field procedure manual coordinates identification number 269 and the procedure manual display flag 226 to the HMD 100A, and returns to Step S221.

In Step S233, the data receiving unit 111A of the HMD 100A stores the in-field procedure manual coordinates 262 corresponding to the received in-field procedure manual coordinates identification number 269 and the procedure manual display flag 226 to the in-field procedure manual coordinates 125 and the procedure manual display flag 127, respectively.

While the operator is working, the layout definition unit 211A and the data receiving unit 111A repeat the process illustrated in FIG. 14.

Second Embodiment: Display Source Image Generation Process

Figure 15:
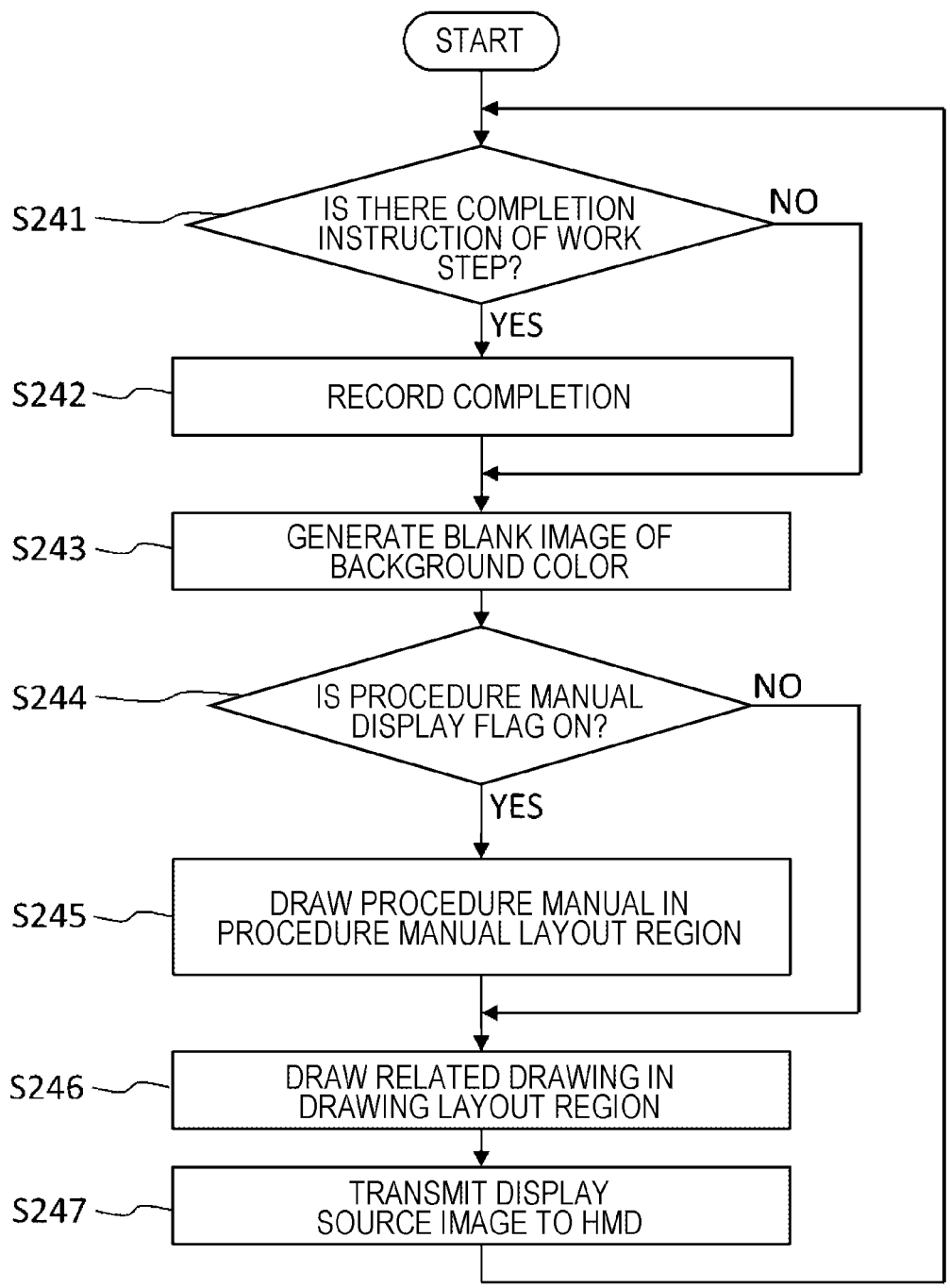
FIG. 15 is a flowchart of a display source image generation process according to the second embodiment.

FIG. 15 is a flowchart of the display source image generation process in the second embodiment. A process in which the smartphone 200A generates the display source image 230 and transmits it to the HMD 100A will be described with reference to FIG. 15.

Steps S241 to S242 are the same processes as Steps S131 to S132 (see FIG. 8).

In Step S243, the display source image generation unit 212A generates a blank image having the same color as the background color 225 and stores it in the display source image 230.

In Step S244, the display source image generation unit 212A proceeds to Step S245 if the procedure manual display flag 226 is "ON" (Step S244→YES), and proceeds to Step S246 if it is not "ON" (Step S244→NO).

Steps S245 to S247 are the same as Steps S134 to S136.

Second Embodiment: Field Image Display Process

Figure 16:
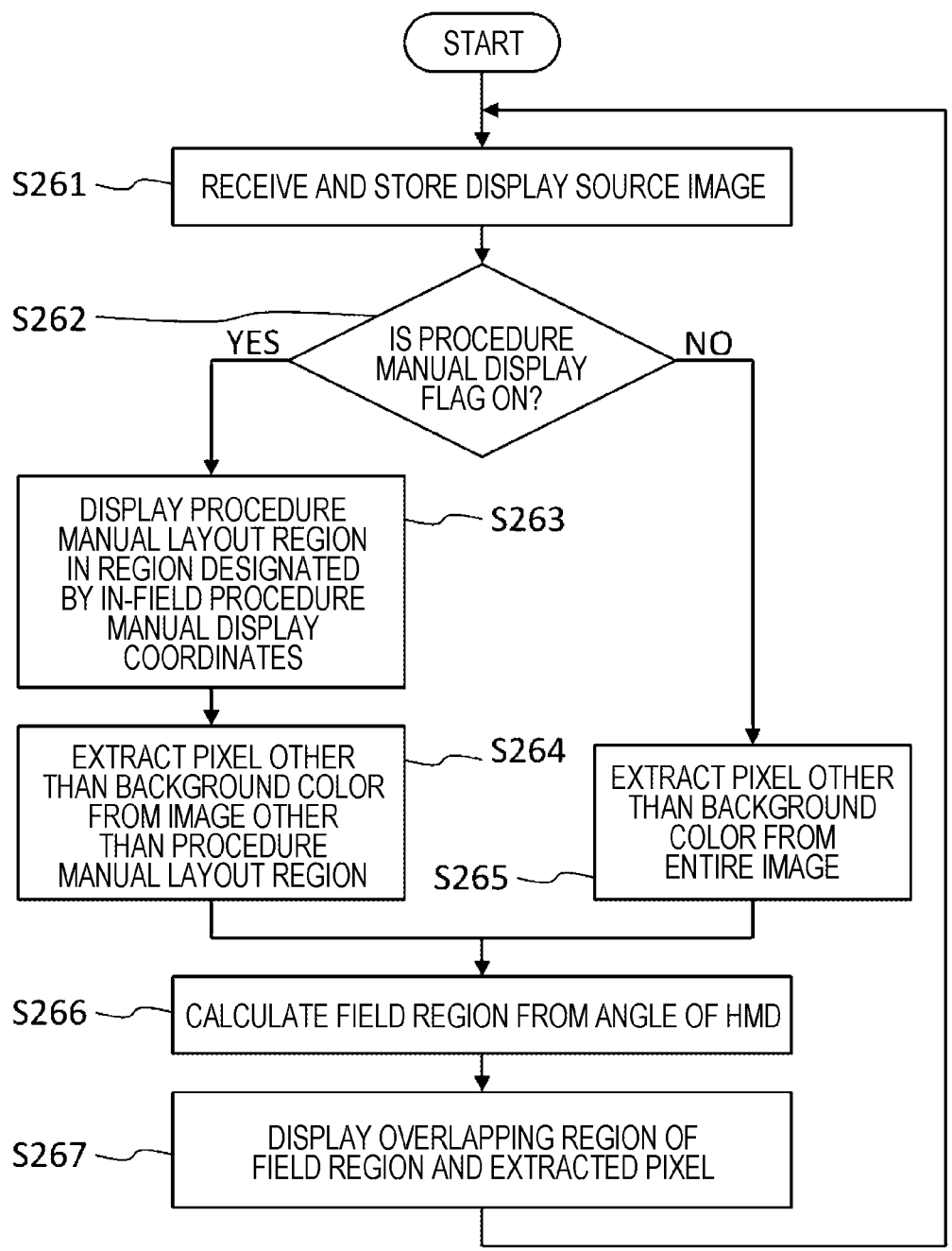
FIG. 16 is a flowchart of a field image display process according to the second embodiment.

FIG. 16 is a flowchart of the field image display process according to the second embodiment. A process in which the HMD 100A generates a field image from the display source image 230 and displays it on the display 181 will be described with reference to FIG. 16.

Step S261 is the same process as Step S151 (see FIG. 9).

In Step S262, the field image display unit 112A proceeds to Step S263 if the procedure manual display flag 127 is "ON" (Step S262→YES), and proceeds to Step S265 if it is not "ON" (Step S262→NO).

Step S263 is the same process as Step S152.

In Step S264, the field image display unit 112A extracts pixels other than the background color 126 from the display source image 122 other than the procedure manual layout region 231 (see FIG. 5) as a related drawing.

In Step S265, the field image display unit 112A extracts pixels other than the background color 126 as a related drawing from the entire display source image 122.

Step S266 is the same process as Step S153 (see FIG. 9).

In Step S267, the field image display unit 112A of the HMD 100A displays the overlapping region of the field region 233 and the pixels extracted as a related drawing in Step S264 or Step S265 in the corresponding region of the display 181, and returns to Step S261. In other words, the field image display unit 112A displays the pixels extracted as a related drawing in Step S264 or Step S265 in the corresponding region of the display 181 in the field region 233, and returns to Step S261.

Second Embodiment: Features of Display System

Compared to the first embodiment, the HMD 100A can switch the display/non-display and the display position of the procedure manual to be displayed on the display 181 according to the instruction to the operator. Therefore, the operator can select non-display when the operator wants to secure a wider field of view, or can switch the position where the procedure manual is displayed according to the work. The operator can easily secure the field of view according to the work step and the posture of the operator, and the work efficiency is improved. Further, since the display portion of the drawing is specified by color instead of coordinates, not only a simple shape such as a rectangle but also a drawing having a complicated shape can be displayed.

Third Embodiment

In the second embodiment, the operator can change the position of the procedure manual displayed on the display 181. Hereinafter, a third embodiment in which the position of the drawing can be changed according to the work step will be described.

FIG. 17 is a data structure diagram of the work manual database 240B according to the third embodiment.

A column (attribute) of a related drawing coordinates 247 is added as compared to the work manual database 240 (see FIG. 4) of the first embodiment. The related drawing coordinates 247 indicate the layout coordinates of the drawing layout region 232 in the display source image 230 (see FIG. 5). In the second embodiment, all the drawing layout regions 232 are the same regardless of the work step (drawing), but in the third embodiment, the drawing layout region 232 can be set for each work step. Further, in the second embodiment, the background color 225 is the same regardless of the work step (drawing), but in the third embodiment, the background color is selected for each drawing.

Although not illustrated, in the third embodiment, reference numerals are given as in a display system 10B, an HMD 100B, a display source image generation unit 212B, and a field image display unit 112B.

Third Embodiment: Display Source Image Generation Process

Figure 18:
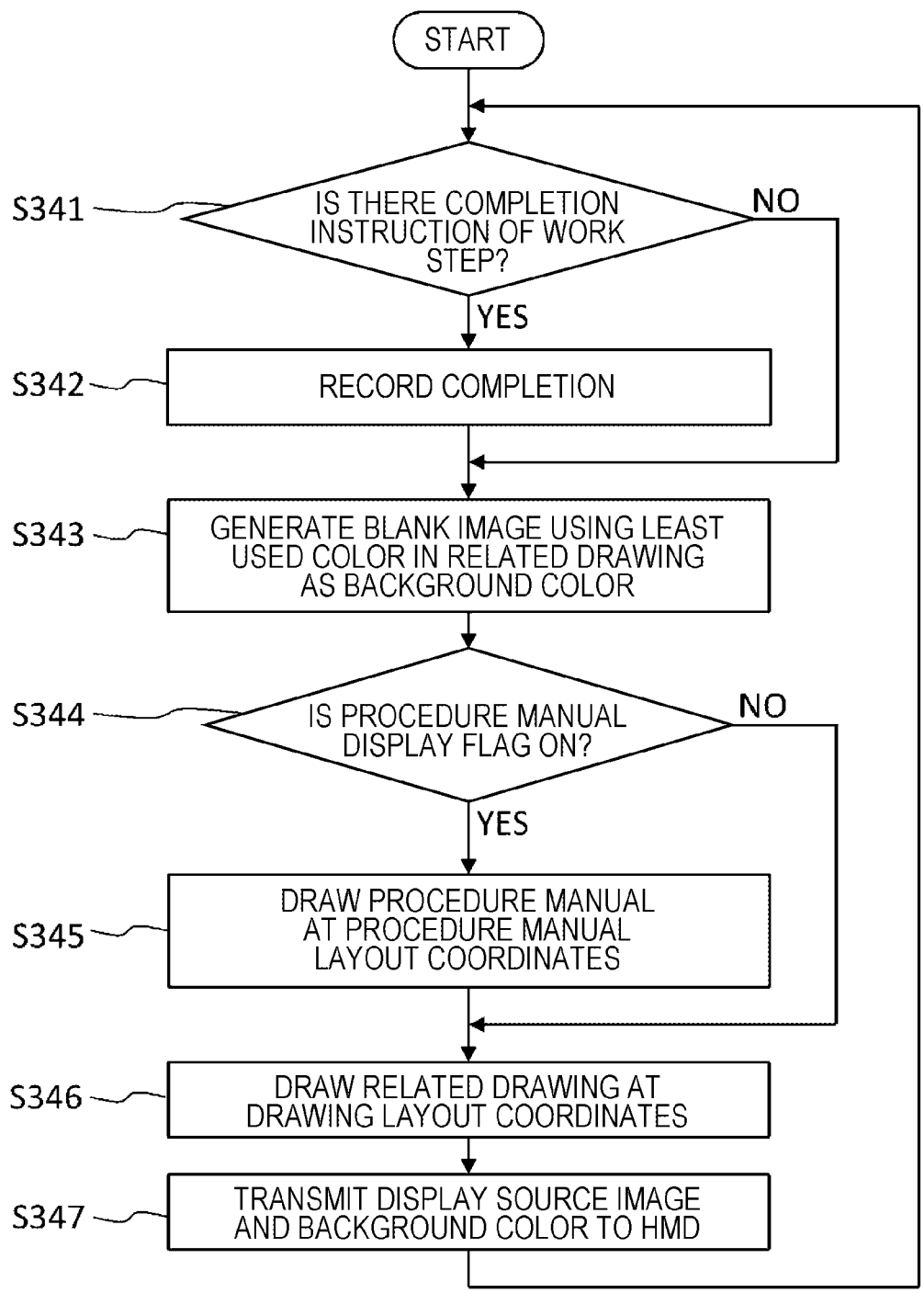
FIG. 18 is a flowchart of a display source image generation process according to the third embodiment.

FIG. 18 is a flowchart of the display source image generation process according to the third embodiment. Steps S341 to S347 excluding Steps S343, S346 and S347 are the same as Steps S241 to S247 (see FIG. 15) excluding Steps S243, S246 and S247, respectively.

In Step S343, the display source image generation unit 212B selects the least used color in the related drawing of the current work step as the background color, generates a blank image of this color, and stores it in the display source image 230. Further, the display source image generation unit 212B stores this color in the background color 225.

In Step S346, the display source image generation unit 212B refers to the work manual database 240B, and draws the related drawing at the related drawing coordinates 247 (see FIG. 17) of the current work step in the display source image 230.

In Step S347, the display source image generation unit 212B transmits the display source image 230 and the background color 225 to the HMD 100B.

Third Embodiment: Field Image Display Process

Figure 19:
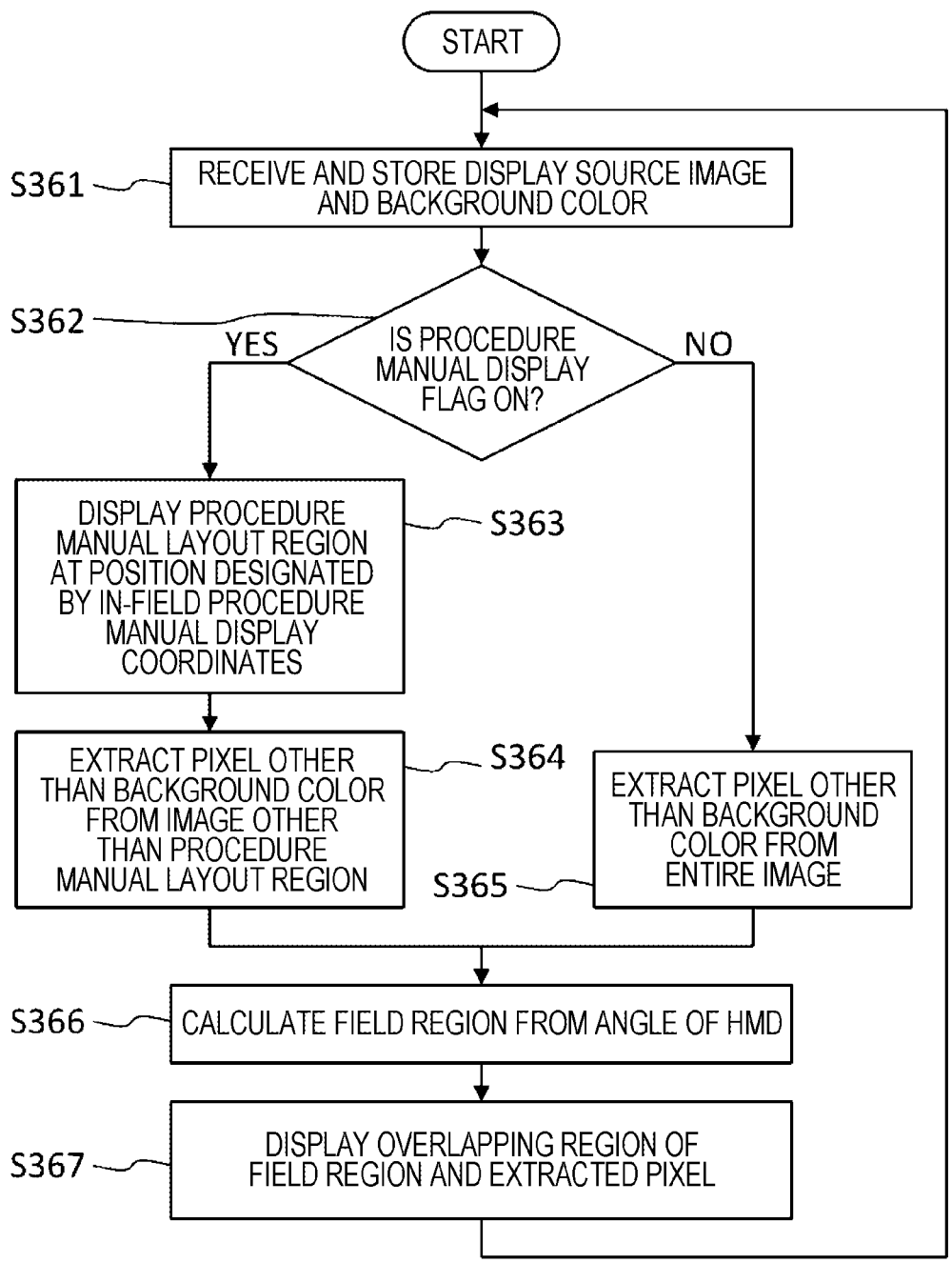
FIG. 19 is a flowchart of a field image display process according to the third embodiment.

FIG. 19 is a flowchart of the field image display process according to the third embodiment. Steps S361 to S367 excluding Step S361 are the same as Steps S261 to S267 (see FIG. 16) excluding Step S261.

In Step S361, the field image display unit 112B receives the display source image 230 and the background color 225, and stores them in the display source image 122 and the background color 126 (see FIG. 10), respectively.

Third Embodiment: Features of Display System

Compared to the second embodiment, the operator can set the display position of the drawing in advance for each work step (drawing). As a result, the orientation of the HMD 100B (operator's face) on which the drawing is displayed can be determined according to the work site, and the usability of the display system 10B is improved.

In addition, a smartphone 200B selects the least used color in each drawing as the background color, which eliminates the trouble of the operator setting the background color as compared to the second embodiment.

Fourth Embodiment

In the above-described embodiment, the display 181 displays the procedure manual and the drawing. Information other than the procedure manual and the drawing may be displayed on the display 181. Hereinafter, a fourth embodiment in which the battery status and time of the smartphone and the message described later are displayed will be described.

Figure 20:
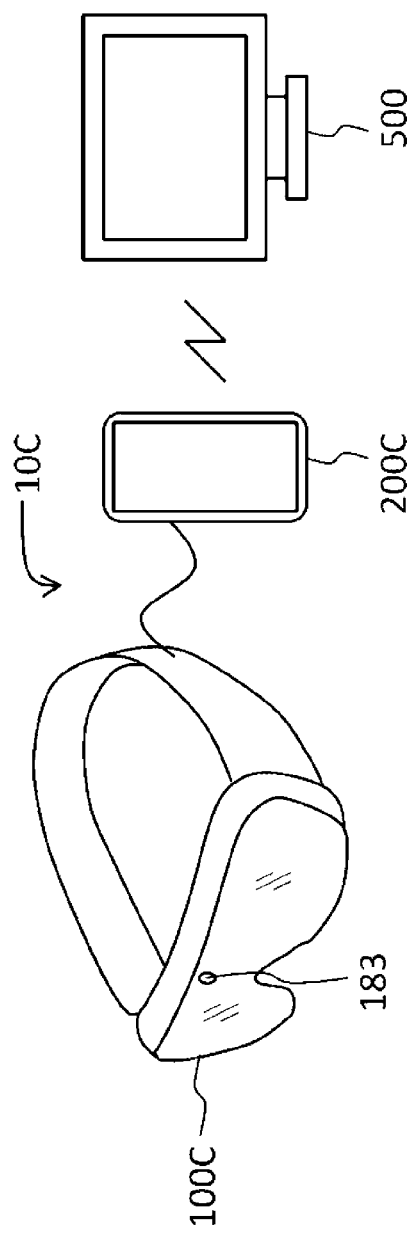
FIG. 20 is a diagram illustrating the configuration of a display system according to a fourth embodiment.

FIG. 20 is a diagram illustrating the configuration of a display system 10C according to the fourth embodiment. The display system 10C includes an HMD 100C, a smartphone 200C, and an administrator terminal 500. The HMD 100C includes a camera 183 at the front that captures an image of the state of work. The smartphone 200C and the administrator terminal 500 are connected by wireless communication, for example, using a 5th generation mobile communication system. The administrator who uses the administrator terminal 500 monitors the work of the operator and transmits a message which is text information as needed to give an instruction to the operator or call attention to the work.

Figure 21:
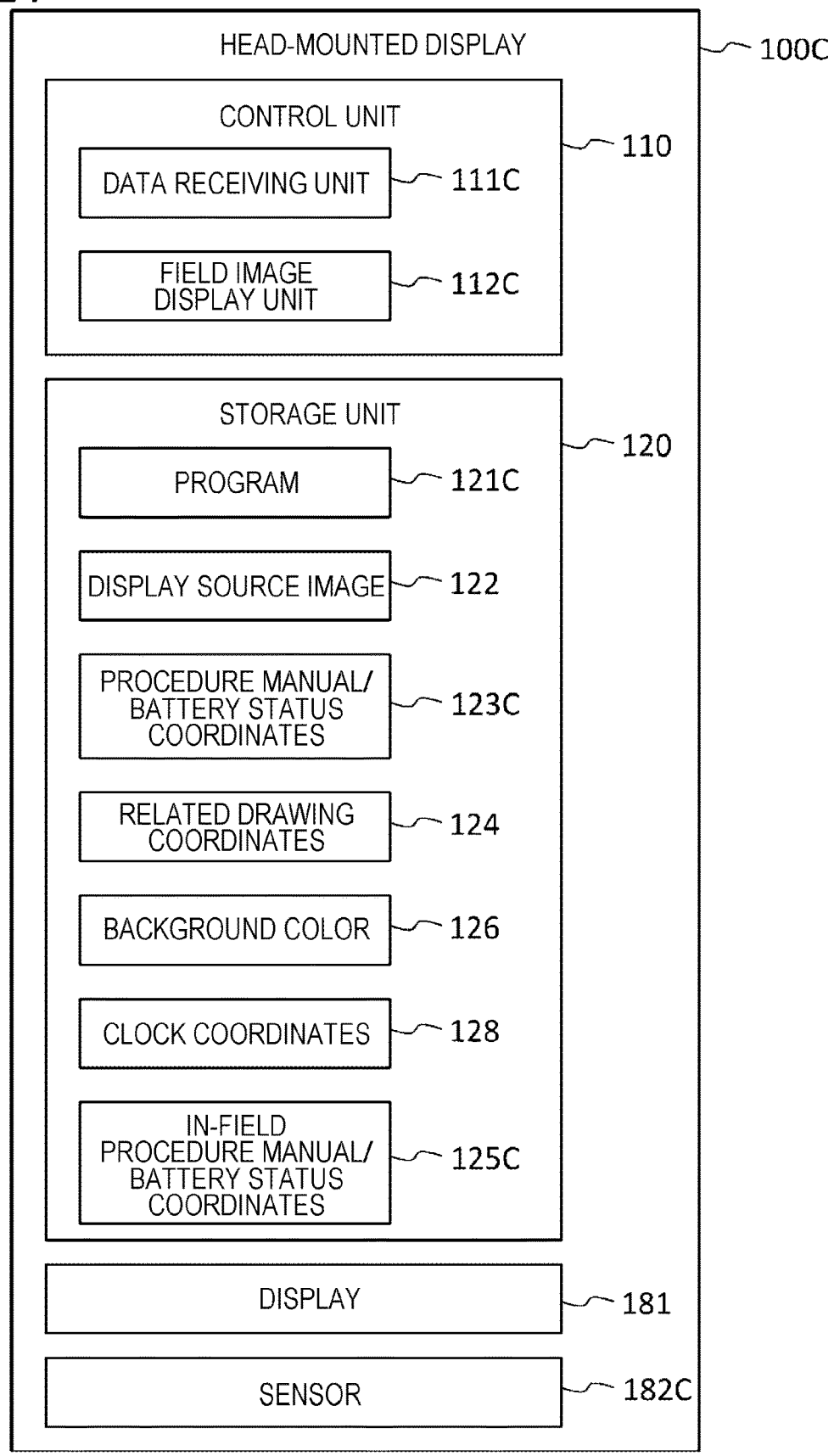
FIG. 21 is a functional block diagram of the HMD according to the fourth embodiment.

FIG. 21 is a functional block diagram of the HMD 100C according to the fourth embodiment. A sensor 182C includes the camera 183 in addition to a gyroscope. A procedure manual/battery status coordinates 123C, a clock coordinates 128, and an in-field procedure manual/battery status coordinates 125C will be described later with reference to FIGS. 23 and 24. A data receiving unit 111C receives the procedure manual/battery status coordinates and the clock coordinates in addition to the display source image, and stores them in the storage unit 120. A field image display unit 112C displays the time, battery status, and message in addition to the procedure manual and the drawing, and transmits the image of the camera 183 to the smartphone 200C.

Figure 22:
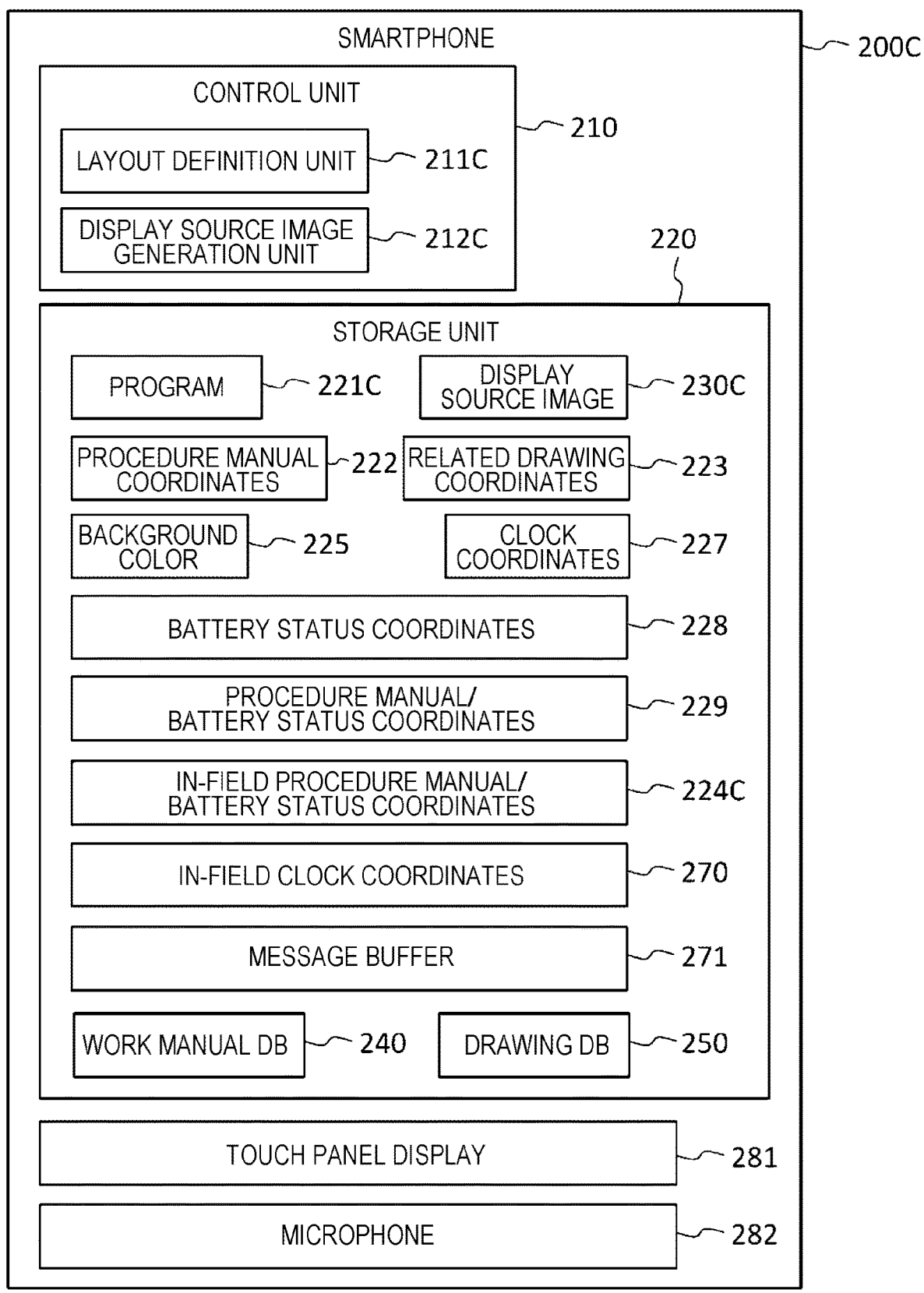
FIG. 22 is a functional block diagram of a smartphone according to the fourth embodiment.

FIG. 22 is a functional block diagram of the smartphone 200C according to the fourth embodiment. A display source image 230C, a clock coordinates 227, a battery status coordinates 228, a procedure manual/battery status coordinates 229, an in-field procedure manual/battery status coordinates 224C, and an in-field clock coordinates 270 will be described later while referring to FIGS. 23 and 24. A message buffer 271 holds the message sent from the administrator terminal 500. A layout definition unit 211C sets the battery status and the layout of the clock in addition to the procedure manual and the drawing, and transmits the layout coordinates to the HMD 100C.

The display source image generation unit 212C generates a display source image including a clock (time) and a message and transmits it to the HMD 100C, and also receives an image of the camera 183 from the HMD 100C and transmits it to the administrator terminal 500.

Figure 23:
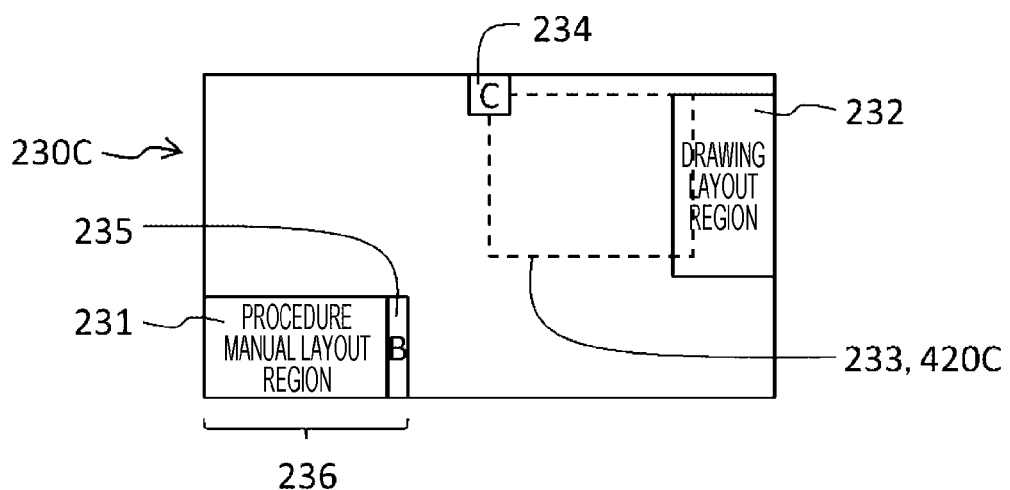
FIG. 23 is a diagram illustrating the configuration of a display source image according to the fourth embodiment.

FIG. 23 is a diagram illustrating the configuration of the display source image 230C according to the fourth embodiment. The difference from the display source image 230 (see FIG. 5) will be described below. A clock layout region 234 (denoted as C in FIG. 23) is a region in which a clock (time) is displayed in the display source image 230C. A battery status layout region 235 (denoted as B in FIG. 23) is a region in which the battery status (remaining battery level) of the smartphone 200C is displayed in the display source image 230C. A procedure manual/battery status layout region 236 is a region in which the procedure manual layout region 231 and the battery status layout region 235 are combined.

The clock coordinates 227 (see FIG. 22) is a layout coordinates of the clock layout region 234 in the display source image 230C. The battery status coordinates 228 is a layout coordinates of the battery status layout region 235 in the display source image 230C. The procedure manual/battery status coordinates 229 is a layout coordinates of the procedure manual/battery status layout region 236 in the display source image 230C.

Figure 24:
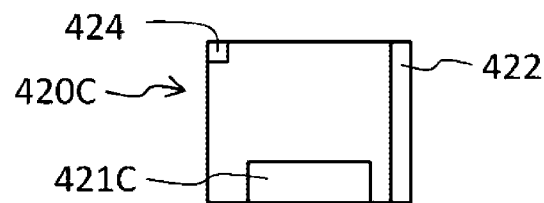
FIG. 24 is a diagram illustrating the configuration of a field image displayed on a display according to the fourth embodiment.

FIG. 24 is a diagram illustrating the configuration of the field image 420C displayed on the display 181 according to the fourth embodiment. An in-field procedure manual/battery status region 421C is a partial region of the field image 420C, and is a region in which the procedure manual and the battery status are displayed side by side. If there is a message from the administrator terminal 500, the message is displayed in the in-field procedure manual/battery status region 421C instead of the procedure manual and the battery status. The in-field clock region 424 is a partial area of the field image 420C and is a region in which the clock is displayed.

The in-field procedure manual/battery status coordinates 224C (see FIG. 22) is a layout coordinates of the in-field procedure manual/battery status region 421C in the field image 420C. The in-field clock coordinates 270 is a layout coordinates of the in-field clock region 424 in the field image 420C.

Fourth Embodiment: Layout Definition Process

Figure 25:
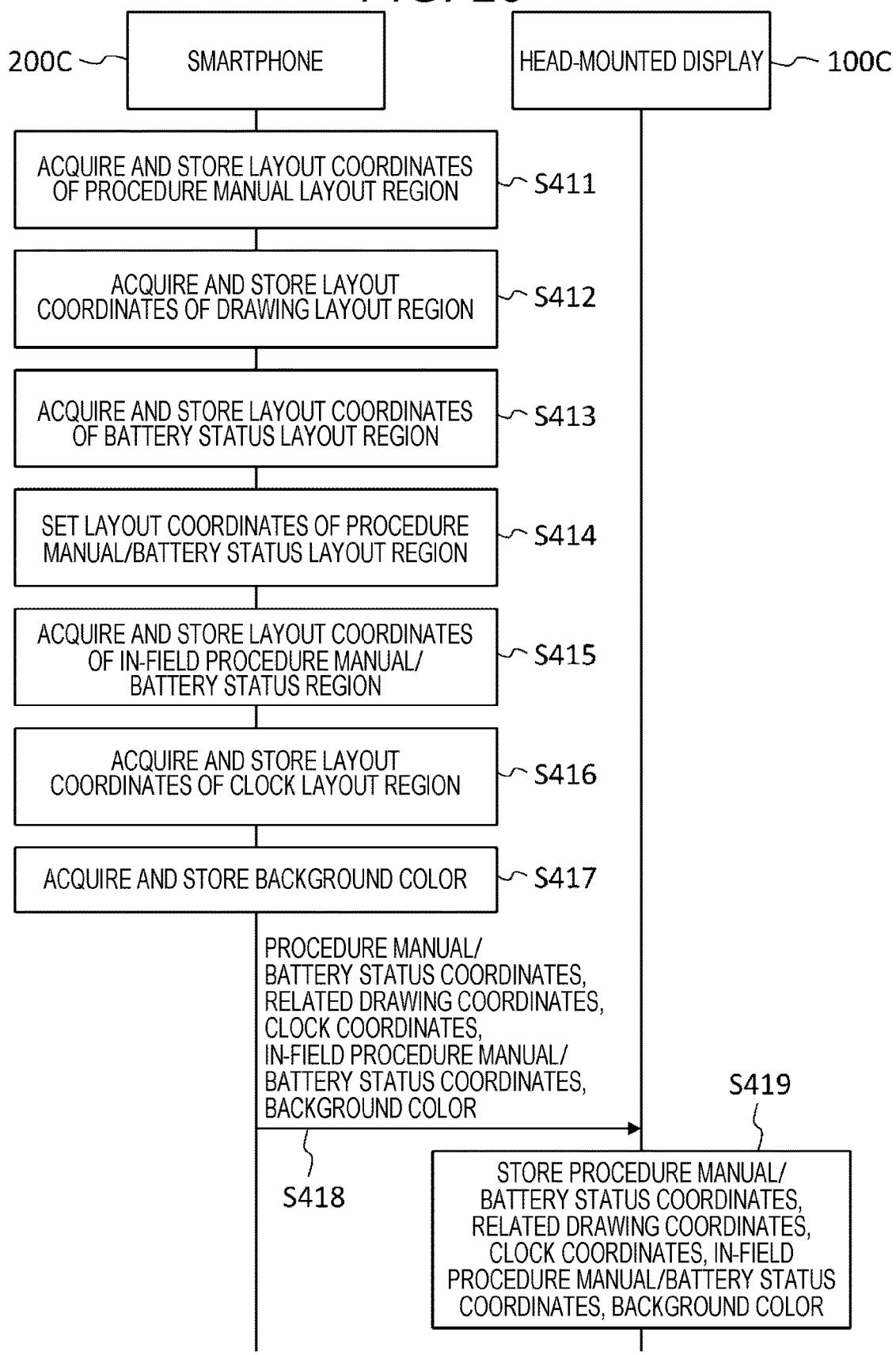
FIG. 25 is a sequence diagram of a layout definition process according to the fourth embodiment.

FIG. 25 is a sequence diagram of the layout definition process according to the fourth embodiment.

In Step S411, the layout definition unit 211C acquires the layout coordinates of the procedure manual layout region 231 in the display source image 230C (see FIG. 23) instructed by the operator who is the user of the display system 10C, and stores the layout coordinates in the procedure manual coordinates 222.

In Step S412, the layout definition unit 211C acquires the layout coordinates of the drawing layout region 232 in the display source image 230C instructed by the operator, and stores the layout coordinates in the related drawing coordinates 223.

In Step S413, the layout definition unit 211C acquires the layout coordinates of the battery status layout region 235 in the display source image 230C instructed by the operator, and stores the layout coordinates in the battery status coordinates 228.

In Step S414, the layout definition unit 211C stores the layout coordinates of the procedure manual/battery status layout region 236 in the procedure manual/battery status arrangement 229. The procedure manual/battery status layout region 236 is a region in which the procedure manual layout region 231 and the battery status layout region 235 are combined.

In Step S415, the layout definition unit 211C acquires the layout coordinates of the in-field procedure manual/battery status region 421C in the field image 420C (see FIG. 24) instructed by the operator, and stores the layout coordinates in the in-field procedure manual/battery status coordinates 224C.

In Step S416, the layout definition unit 211C acquires the layout coordinates of the clock layout region 234 in the display source image 230C instructed by the operator, and stores the layout coordinates in the clock coordinates 227.

In Step S417, the layout definition unit 211C acquires the background color of the drawing instructed by the operator, and stores the background color in the background color 225.

In Step S418, the layout definition unit 211C transmits the procedure manual/battery status coordinates 229, the related drawing coordinates 223, the clock coordinates 227, the in-field procedure manual/battery status coordinates 224C, and the background color 225 to the HMD 100C.

In Step S419, the data receiving unit 111C stores the received procedure manual/battery status coordinates 229, the related drawing coordinates 223, the clock coordinates 227, the in-field procedure manual/battery status coordinates 224C, and the background color 225 in the procedure manual/battery status coordinates 123C, the related drawing coordinates 124, the clock coordinates 128, the in-field procedure manual/battery status coordinates 125C, and the background color 126, respectively.

Fourth Embodiment: Display Source Image Generation Process

Figure 26:
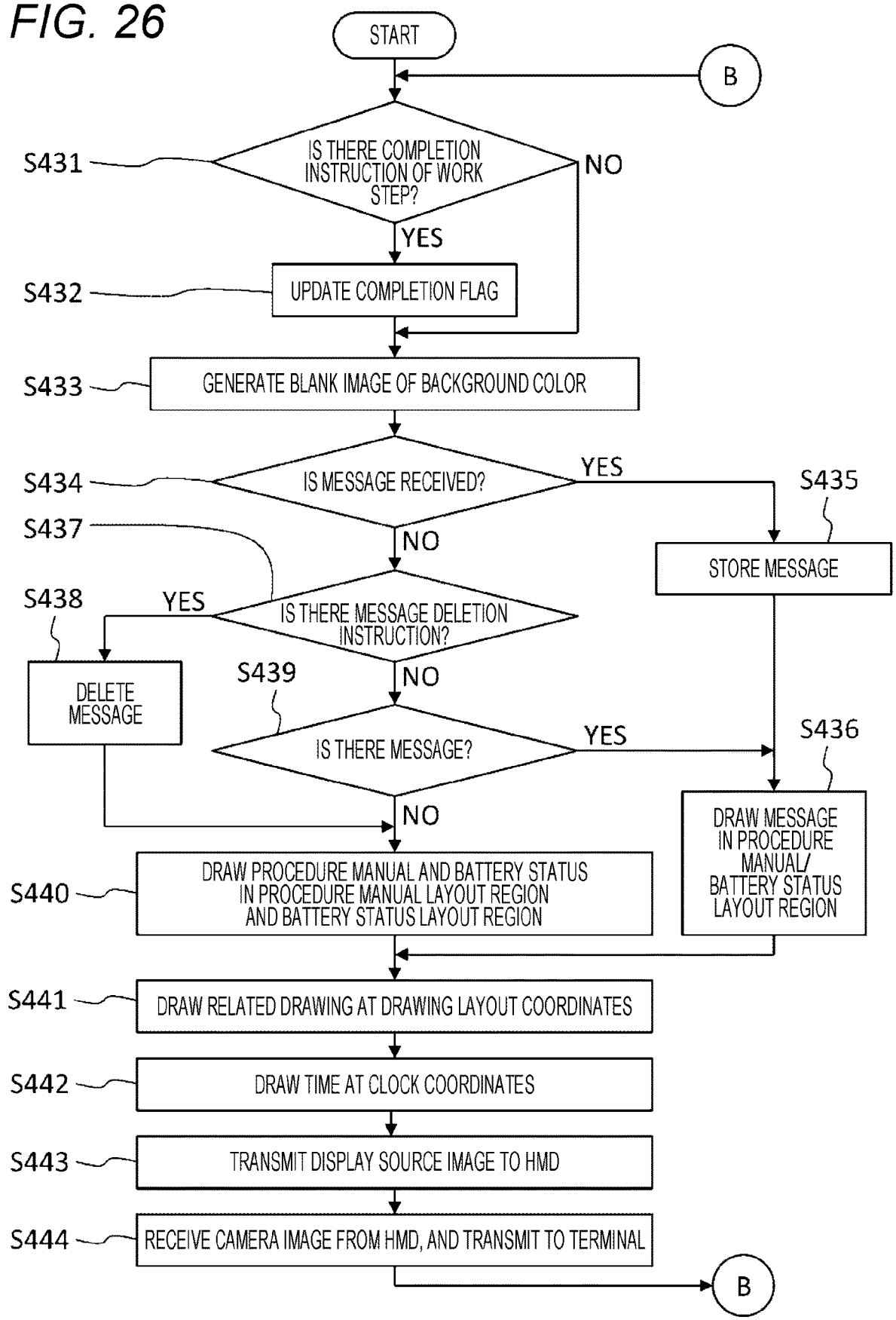
FIG. 26 is a flowchart of a display source image generation process according to the fourth embodiment.

FIG. 26 is a flowchart of the display source image generation process according to the fourth embodiment. The major difference from the first embodiment and the second embodiment is the process when a message arrives from the administrator terminal 500.

Steps S431 to S433 are the same processes as Steps S241 to S243 (see FIG. 15).

In Step S434, the display source image generation unit 212C proceeds to Step S435 if it has received a message from the administrator terminal 500 (Step S434→YES), and proceeds to Step S437 if it has not received it (Step S434→NO).

In Step S435, the display source image generation unit 212C stores the received message in the message buffer 271.

In Step S436, the display source image generation unit 212C draws the message in the message buffer 271 in the procedure manual/battery status layout region 236 (see FIG. 23) of the display source image 230C, and proceeds to Step S441.

In Step S437, the display source image generation unit 212C proceeds to Step S438 if it has received a message deletion instruction from the administrator terminal 500 (Step S437→YES), and proceeds to Step S439 if it has not received it (Step S437→NO).

In Step S438, the display source image generation unit 212C deletes the message stored in the message buffer 271.

In Step S439, the display source image generation unit 212C proceeds to Step S436 if there is a message in the message buffer 271 (Step S439→YES), and proceeds to Step S440 if not (Step S439→NO).

In Step S440, the display source image generation unit 212C draws the procedure manual and the battery status, which are the work contents 243 (see FIG. 4) of the current work step, to the procedure manual layout region 231 and the battery status layout region 235 (see FIG. 23) of the display source image 230C respectively, and proceeds to Step S441.

Step S441 is the same as Step S135 (see FIG. 8).

In Step S442, the display source image generation unit 212C draws the clock (time) in the clock layout region 234 of the display source image 230C.

In Step S443, the display source image generation unit 212C transmits the display source image 230C to the HMD 100C.

In Step S444, the display source image generation unit 212C receives the image acquired by the camera 183 from the HMD 100C, transmits the image to the administrator terminal 500, and returns to Step S431. The process of the HMD 100C transmitting the image of the camera 183 corresponds to Step S456 in FIG. 27, which will be described later.

Fourth Embodiment: Field Image Display Process

Figure 27:
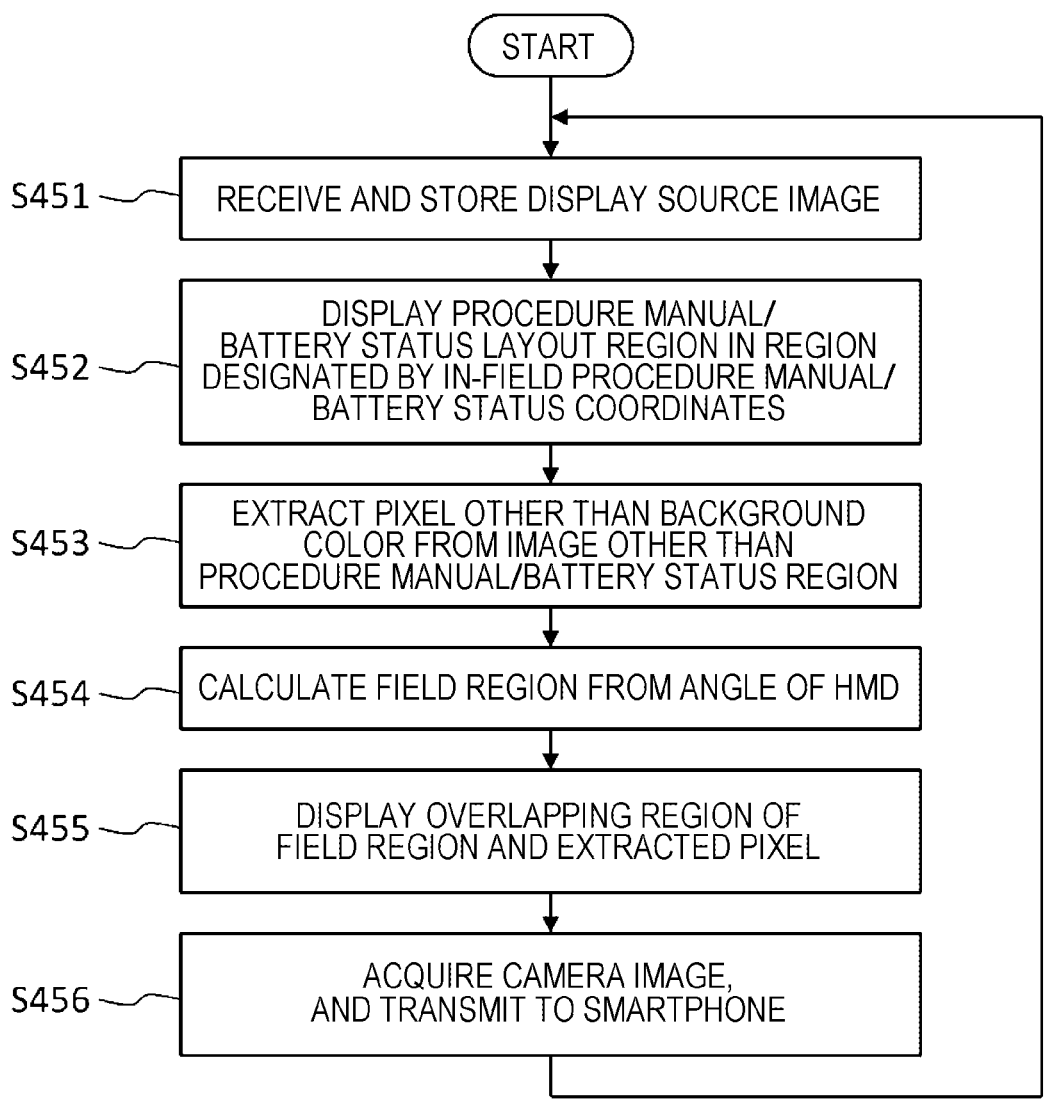
FIG. 27 is a flowchart of a field image display process according to the fourth embodiment.

FIG. 27 is a flowchart of the field image display process according to the fourth embodiment. The major difference from the field image display process of the second embodiment (see FIG. 16) is the process of transmitting the image of the camera 183 (see Step S456).

Step S451 is the same process as Step S151 (see FIG. 9).

In Step S452, the field image display unit 112C displays the procedure manual/battery status layout region 236 (see FIG. 23, a partial region of the display source image 122 indicated by the procedure manual/battery status coordinates 123C) in the region of the display 181 specified with the in-field procedure manual/battery status coordinates 125C.

In Step S453, the field image display unit 112C extracts pixels other than the background color 126 from the display source image 122 other than the procedure manual/battery status layout region 236 as a related drawing.

Step S454 is the same process as Step S153.

In Step S455, the field image display unit 112C displays the overlapping region of the field region 233 and the pixels extracted as the related drawing in Step S453 in the corresponding region of the display 181. In other words, the field image display unit 112C displays the pixels extracted as the related drawing in Step S453, which is in the field region 233, in the corresponding region of the display 181.

In Step S456, the field image display unit 112C transmits the image captured by the camera 183 to the smartphone 200C, and returns to Step S451.

Fourth Embodiment: Features of Display System

In the fourth embodiment, in addition to the procedure manual and the drawing, the battery status and time of the smartphone 200C are displayed on the display 181. As a result, the operator can check the battery status and time of the smartphone 200C without interrupting the work.

The administrator who uses the administrator terminal 500 is not at the site, but can know the working state from the image of the camera 183. In addition, the administrator can transmit a message to give an instruction to the operator and notify the operator of precautions to support the work, so that the operator can proceed with the work efficiently.

Fifth Embodiment

In the above-described embodiment, the operator can change the position of the contents such as the procedure manual and the drawing displayed on the display 181 of the HMDs 100 to 100C. In the layout definition unit 211 (see FIG. 3) in the first embodiment, the smartphone 200 transmits the layout coordinates of the procedure manual layout region 231, the drawing layout region 232, and the in-field procedure manual region 421 to the HMD 100 in advance (see Step S114 in FIG. 7).

In addition to the layout coordinates, the layout definition unit 211A in the second embodiment also transmits the procedure manual display flag 226 (see FIG. 11) indicating the display/non-display of the procedure manual to the HMD 100A (see Step S215 in FIG. 13). The layout definition unit 211C in the fourth embodiment also transmits the layout coordinates of the clock layout region 234 (see FIG.

23) and the procedure manual/battery status layout region 236 to the HMD 100C (see Step S418 illustrated in FIG. 25).

In the fifth embodiment, the display source image 230 (see FIGS. 5 and 23) is divided into a plurality of regions (hereinafter, also referred to as divided display source image regions), and the operator can select the procedure manual layout region 231 from among the divided display source image regions. This allows the operator to easily specify the region where the procedure manual is to be placed. In addition, by simplifying the communication procedure between an HMD 100D (see FIG. 28 below) and a smartphone 200D (see FIG. 31 below), implementation becomes easy.

Further, in the display source image 230 generated by the smartphone 200D, the background color other than the procedure manual and the drawing is set to the color transmitted by the HMD 100D (for example, R value=G value=B value=0). As a result, the HMD 100D does not need to consider the layout coordinates of the procedure manual and the drawing, and can be easily implemented.

In the fifth embodiment, the following (1) to (4) are premised.

(1) The aspect ratio of the display 181 of the HMD 100D is 16:9.

(2) The aspect ratio of the touch panel display 281 of the smartphone 200D is 18:9.

(3) The size (size, number of pixels) of the display source image 230 (see FIG. 5) is 3×3 times that of the display 181 (3 times both vertically and horizontally). The aspect ratio of the display source image 230 is the same as that of the display 181 and is 16:9.

(4) The display source image 230 and the touch panel display 281 have the same horizontal length (number of pixels).

The above assumption is an example, and is not limited to this. For example, the aspect ratio may be different from 16:9 or 18:9. Further, the size ratio between the display source image 230 and the display 181 or the touch panel display 281 may be different from the above.

Fifth Embodiment: Configuration of HMD

Figure 28:
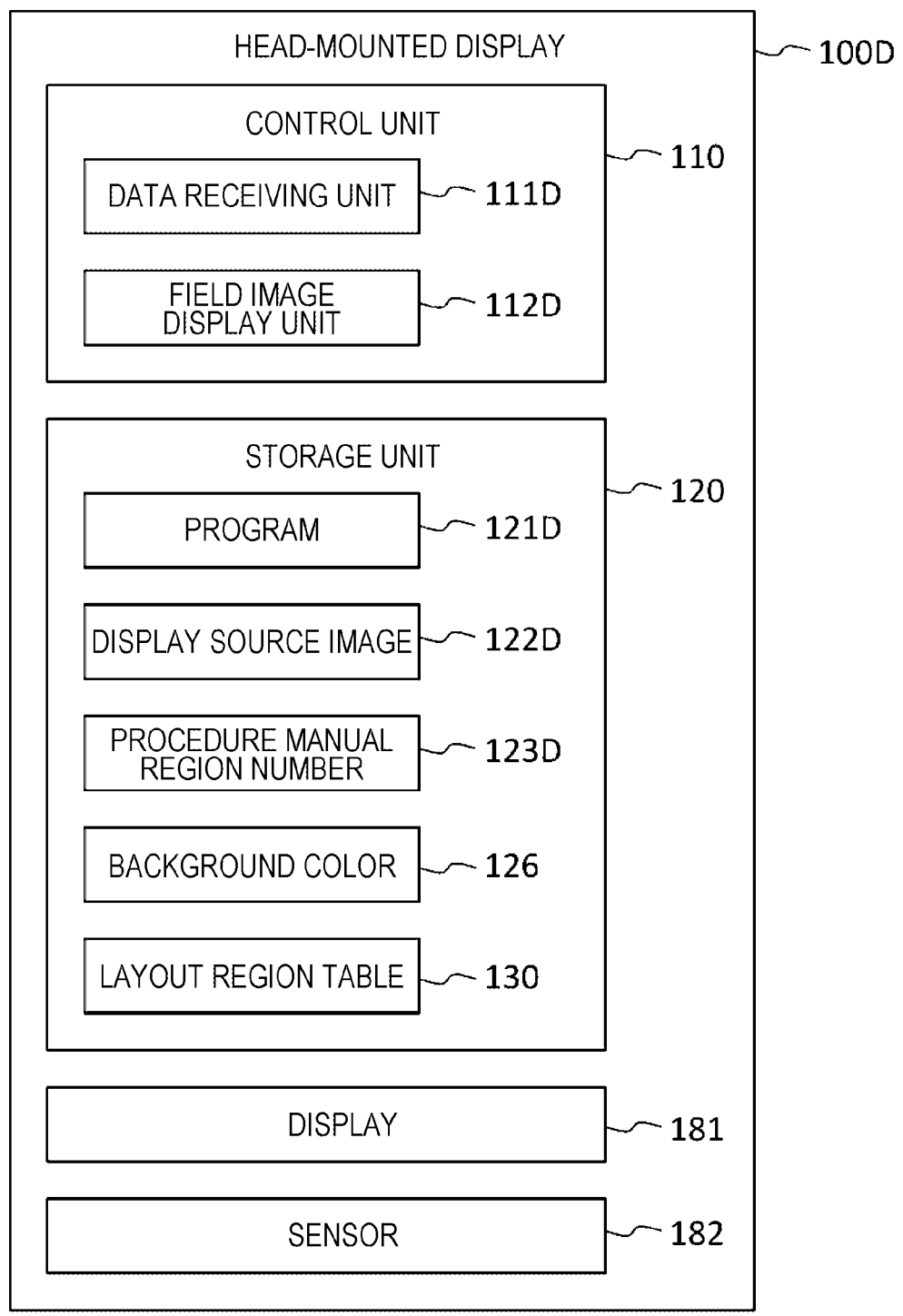
FIG. 28 is a functional block diagram of the HMD according to a fifth embodiment.

FIG. 28 is a functional block diagram of the HMD 100D according to the fifth embodiment. Compared to the HMD 100 (see FIG. 2) of the first embodiment, a procedure manual region number 123D in which the identification number of the divided display source image region in which the procedure manual is arranged is stored instead of the procedure manual coordinates 123. In addition, the related drawing coordinates 124 and the in-field procedure manual coordinates 125 are eliminated, and a layout region table 130 (see FIG. 30 described later) and the background color 126 are added. The background color 126 is the same as that of the second embodiment (see FIG. 10), and is a color that serves as a background for the procedure manual and the drawing. The pixels of the color other than the background color 126 in the display source image 230 become the procedure manual and the drawing.

The data receiving unit 111D receives the display source image 230 and the identification number of the divided display source image region in which the procedure manual is arranged from the smartphone 200D, and stores the identification numbers in a display source image 122D and the procedure manual region number 123D, respectively. A field image display unit 112D displays the procedure manual and the drawing on the display 181 with reference to the layout region table 130 and the procedure manual region number 123D.

Figure 29:
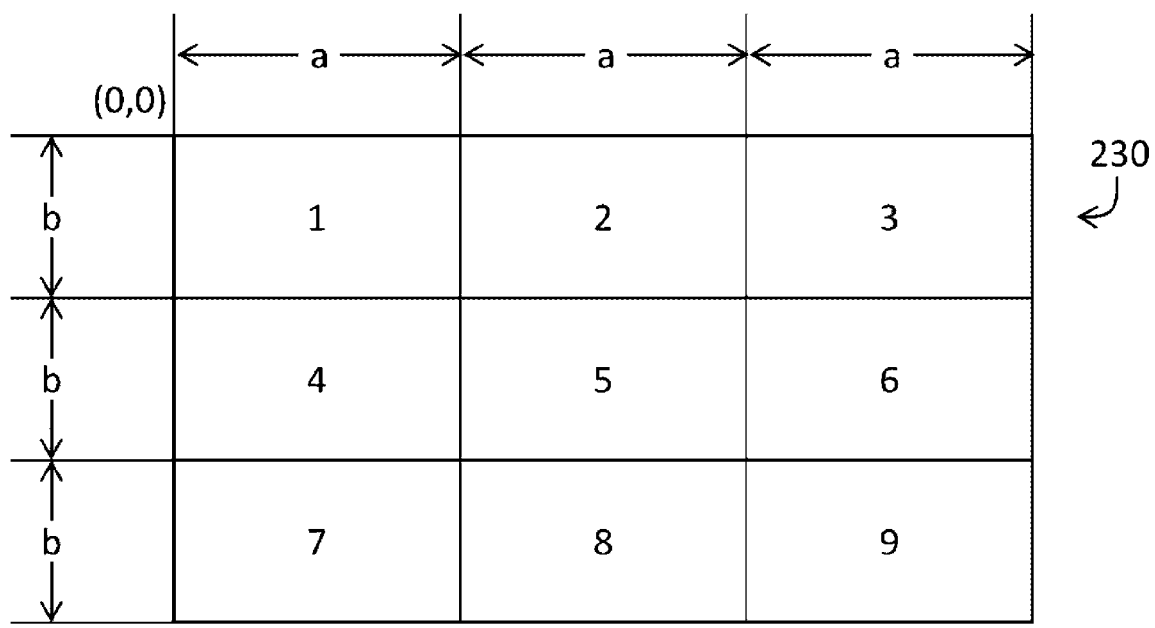
FIG. 29 is a diagram for explaining a divided display source image region according to the fifth embodiment.

FIG. 29 is a diagram for explaining the divided display source image region according to the fifth embodiment. The divided display source image region is a region obtained by dividing the display source image 230 into 3×3. The numbers 1 to 9 are identification numbers assigned to the divided display source image regions. The magnitude (size, number of vertical and horizontal pixels) of each divided display source image region is the same as the magnitude of the display 181 (see FIG. 1) of the HMD 100D (see the premise (3) of the fifth embodiment described above), and includes a pixels in the horizontal direction and b pixels in the vertical direction.

FIG. 30 is a data structure of the layout region table 130 stored in the HMD 100D according to the fifth embodiment. The layout region table 130 is tabular data, and one row (record) indicates one divided display source image region, and includes a column (attributes) of number 131, coordinates 132, and size 133.

The number 131 is the identification number of the divided display source image region. The coordinates 132 is the coordinates of the divided display source image region, and is the coordinates of the upper left vertex of the divided display source image region in the display source image 230. The upper left of the display source image 230 is the origin (0, 0). The size 133 is the size of the divided display source image region.

Fifth Embodiment: Configuration of Smartphone

Figure 31:
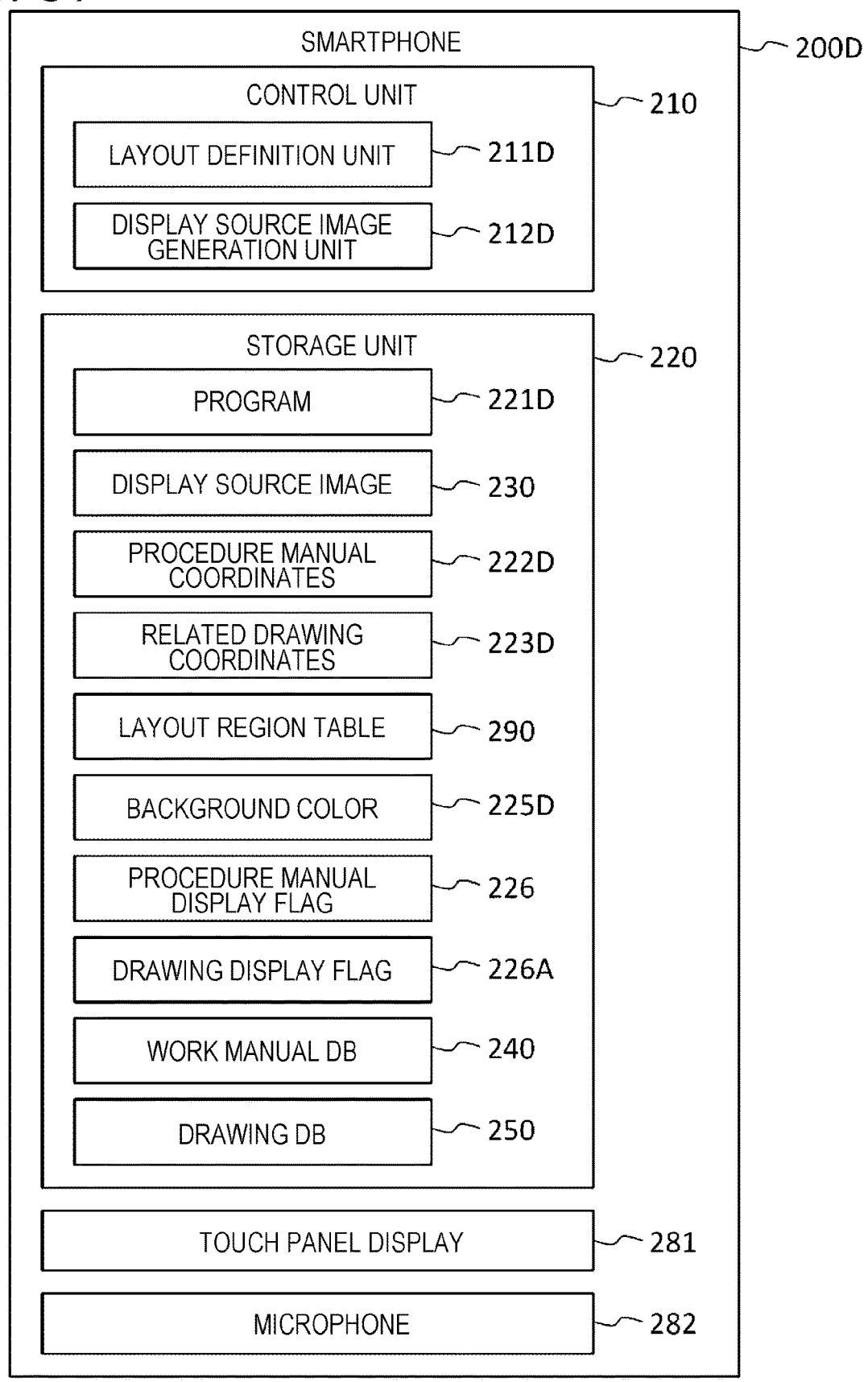
FIG. 31 is a functional block diagram of a smartphone according to the fifth embodiment.

FIG. 31 is a functional block diagram of the smartphone 200D according to the fifth embodiment. Compared to the smartphone 200A (see FIG. 11) of the second embodiment, in the storage unit 220, the in-field procedure manual coordinates table 260 and the in-field procedure manual coordinates identification number 269 are eliminated, and instead, a layout region table 290 (see FIG. 32 below) and a drawing display flag 226A are added.

The procedure manual display flag 226 and the drawing display flag 226A are flags for setting whether to display the procedure manual and the drawing on the display 181 of the HMD 100D, respectively. In the second embodiment, procedure manual display flag 226 is transmitted to the HMD 100A (see Step S215 described in FIG. 13, and Step S232 described in FIG. 14), whereas in the fifth embodiment, the procedure manual display flag 226 and the drawing display flag 226A are not transmitted (see Step S515 in FIG. 34 below).

Figure 32:
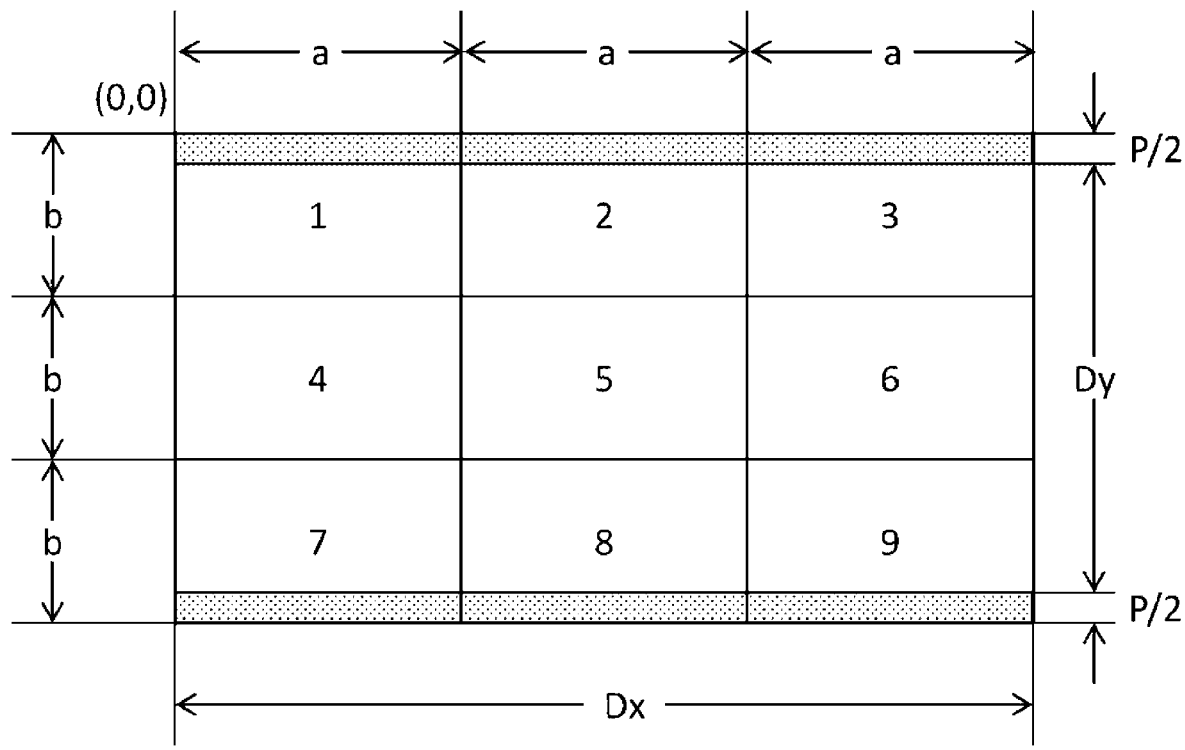
FIG. 32 is a diagram for explaining a layout region table stored in the smartphone according to the fifth embodiment.

FIG. 32 is a diagram for explaining the layout region table 290 (see FIG. 33 described later) stored in the smartphone 200D according to the fifth embodiment. Each region numbered 1 to 9 is a divided display source image region, and the size is a pixels in the horizontal direction and b pixels in the vertical direction. The region of Dx pixels in the horizontal direction and Dy pixels in the vertical direction, excluding the two hatched regions (padding) from the nine divided display source image regions, corresponds to the touch panel display 281 (see FIG. 31) of the smartphone 200D, and Dx:Dy=18:9. The heights of the upper and lower paddings are P/2, respectively. The value of P is Dx:Dy+P=16:9=a:b and is set so as to have the aspect ratio of the display source image 230.

The position and size of the padding described above are examples. For example, the paddings may be arranged left and right, only on the top, or vertically and horizontally. The padding is not necessary. For example, if the display source image 230, the display 181, and the touch panel display 281 have the same aspect ratio, they may not be necessary.

Figure 33:
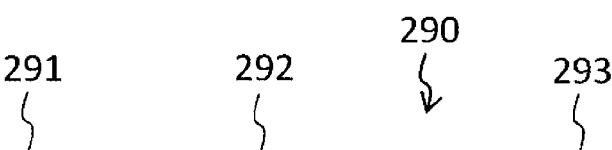
FIG. 33 is a data structure diagram of a layout region table stored in the smartphone according to the fifth embodiment.

FIG. 33 is a data structure diagram of the layout region table 290 stored in the smartphone 200D according to the fifth embodiment. The layout region table 290 is tabular data, one row (record) indicates a divided display source image region on one touch panel display 281, and includes a column (attributes) of number 291 and coordinates 292 and size 293.

The number 291 is the identification number of the divided display source image region. The coordinates 292 is the coordinates of the divided display source image region on the touch panel display 281 and is the coordinates of the upper left vertex of the divided display source image region on the touch panel display 281 in the display source image 230. The upper left vertex of the display source image 230 is the origin (0,0). The size 293 is the size of the divided display source image region on the touch panel display 281.

The heights of the divided display source image regions of the identification numbers 1 to 3 and 7 to 9 are (b-P/2) pixels. Further, the coordinates 292 of the divided display source image region on the touch panel display 281 having the identification number 1 is (0, P/2).

Returning to FIG. 31, a layout definition unit 211D receives an instruction of the operator, and sets the region for arranging the procedure manual from the layout region table 290 as the procedure manual layout region 231 (see FIG. 5). A display source image generation unit 212D generates a display source image 230 including a procedure manual and a related drawing, and transmits the display source image 230 to the HMD 100D.

Fifth Embodiment: Layout Definition Process

Figure 34:
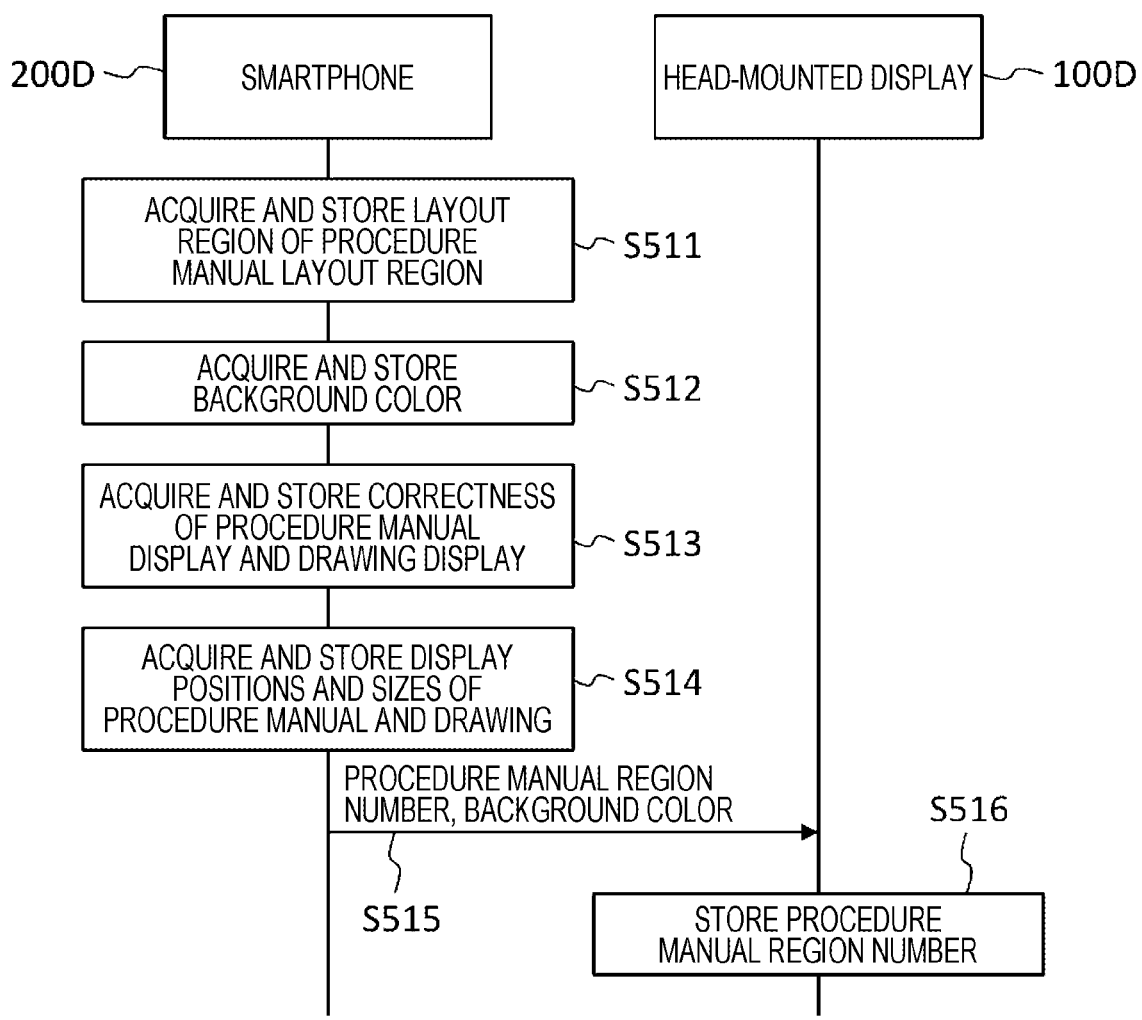
FIG. 34 is a sequence diagram of a layout definition process according to the fifth embodiment.

FIG. 34 is a sequence diagram of the layout definition process according to the fifth embodiment.

In Step S511, the layout definition unit 211D of the smartphone 200D displays a procedure manual layout region setting screen 600 (see FIG. 35 below) on the touch panel display 281 to the operator, and urges the operator to select the divided display source image region where the procedure manual is arranged.

Figure 35:
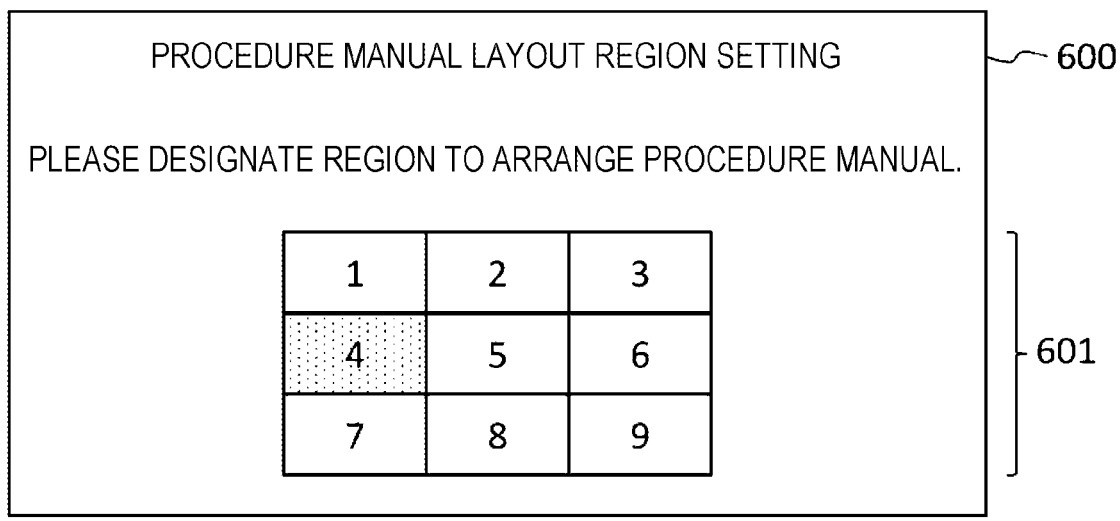
FIG. 35 is a screen configuration diagram of a procedure manual layout region setting screen according to the fifth embodiment.

FIG. 35 is a screen configuration diagram of the procedure manual layout region setting screen 600 according to the fifth embodiment.

The procedure manual layout region setting screen 600 includes a map 601 illustrating the display source image 230 divided into nine divided display source image regions. The operator selects a region in which the procedure manual is arranged by tapping any of the divided display source image regions. FIG. 35 illustrates that the divided display source image region with the identification number 4 is tapped, highlighted and selected. In the following description, it is assumed that the divided display source image region of the identification number 4 is selected.

Returning to FIG. 34, in Step S512, the layout definition unit 211D acquires the background color instructed by the operator and stores the background color in the background color 225D (see FIG. 31). In the following, it will be described assuming that R value=G value=B value=0 is instructed.

In Step S513, the layout definition unit 211D acquires the correctness of the display of the procedure manual instructed by the operator and the correctness of the display of the related drawing, and stores them in the procedure manual display flag 226 and the drawing display flag 226A.

In Step S514, the layout definition unit 211D displays the display source image 230 (see FIG. 36 described later) on the touch panel display 281 and receives changes in the positions and sizes of the procedure manual layout region 231 and the drawing layout region 232 (see FIGS. 36 and 37 described later). Upon receiving the change, the layout definition unit 211D stores the layout coordinates of the procedure manual layout region 231 in a procedure manual coordinates 222D, and stores the layout coordinates of the drawing layout region 232 in a related drawing coordinates 223D.

Figure 36:
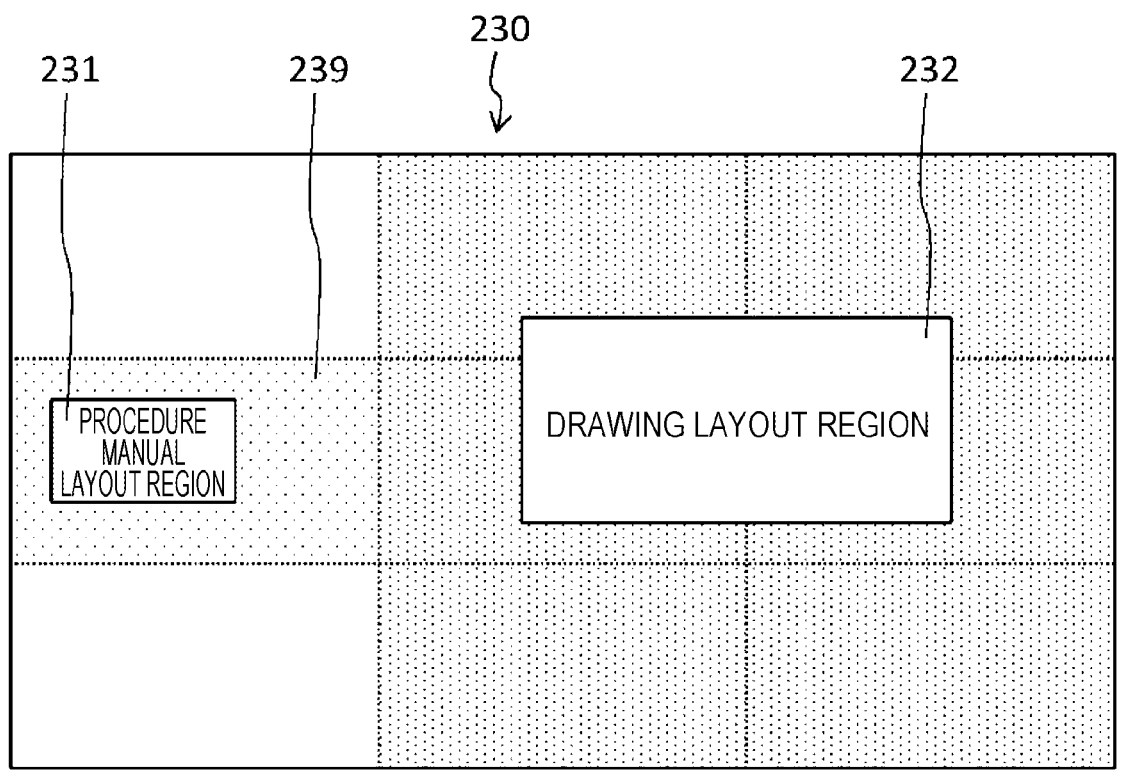
FIG. 36 is a diagram for explaining a change in the positions of a procedure manual layout region and a drawing layout region according to the fifth embodiment.

FIG. 36 is a diagram for explaining the change of the positions of the procedure manual layout region 231 and the drawing layout region 232 according to the fifth embodiment. The broken line on the display source image 230 indicates the boundary of the divided display source image region. In Step S511, the divided display source image region 239 having the identification number 4 is selected as the region for arranging the procedure manual. Therefore, at the start of Step S514, the procedure manual layout region 231 is arranged in a divided display source image region 239 (thin hatched region). The drawing layout region 232 is arranged in another divided display source image region (dark hatched area).

The layout definition unit 211D detects a swipe operation of the procedure manual layout region 231, and receives an instruction to move the procedure manual layout region 231. The procedure manual layout region 231 can be moved within the divided display source image region 239 of the identification number 4.

The layout definition unit 211D detects the swipe operation of the drawing layout region 232, and receives an instruction to move the drawing layout region 232. The drawing layout region 232 can be moved within the other divided display source image region (dark hatched area).

Figure 37:
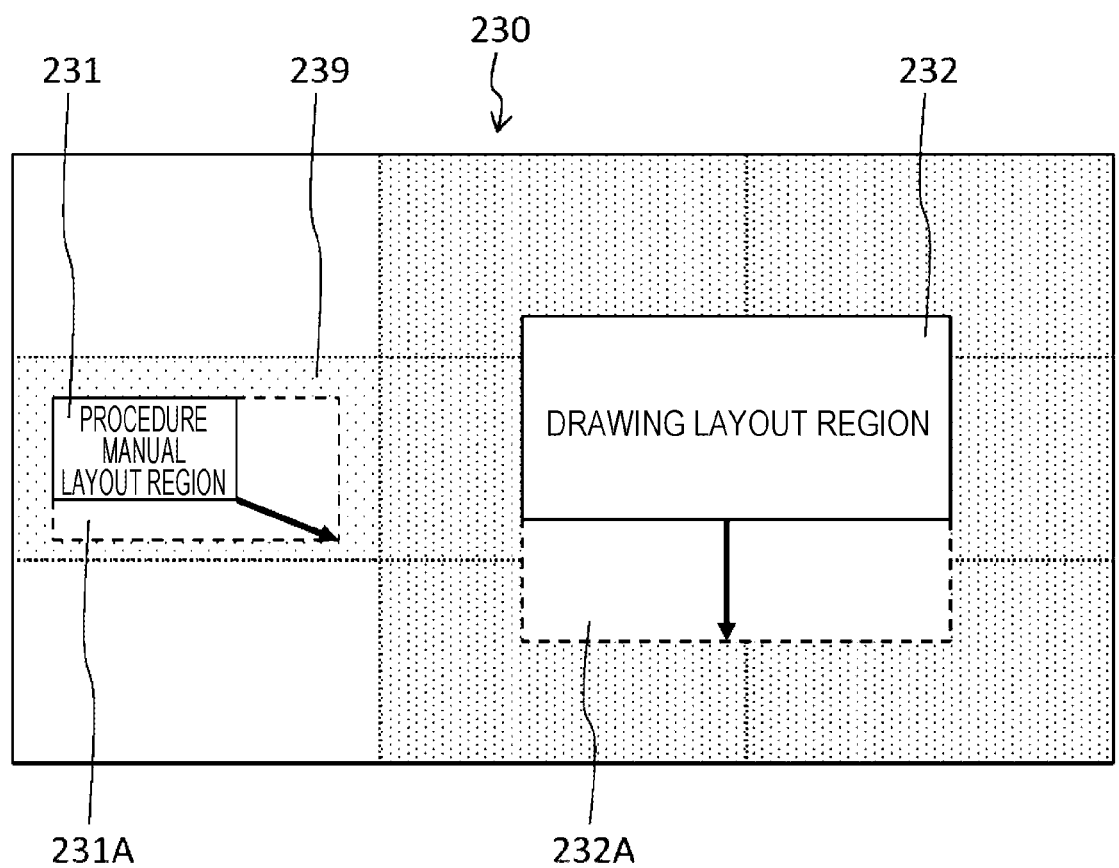
FIG. 37 is a diagram for explaining a change in the size of the procedure manual layout region and the drawing layout region according to the fifth embodiment.

FIG. 37 is a diagram for explaining the change in size of the procedure manual layout region 231 and the drawing layout region 232 according to the fifth embodiment. The layout definition unit 211D detects the swipe operation of the vertex or side of the procedure manual layout region 231, and receives an instruction to change the size of the procedure manual layout region 231. The procedure manual layout region 231 can be expanded in the divided display source image region 239 of the identification number 4. FIG. 37 illustrates an operation in which the lower right vertex of the procedure manual layout region 231 is swiped to expand to a region 231A.

The layout definition unit 211D detects the swipe operation of the vertex or side of the drawing layout region 232, and receives an instruction to change the size of the drawing layout region 232. The drawing layout region 232 can be expanded in the other divided display source image region (dark hatched area). FIG. 37 illustrates an operation in which the lower side of the drawing layout region 232 is swiped to expand to a region 232A.

The layout definition unit 211D receives pinch-in and pinch-out operations as size changing operations of the procedure manual layout region 231 and the drawing layout region 232.

Returning to FIG. 34, in Step S515, the layout definition unit 211D transmits the identification number (4 in the current description) and the background color of the divided display source image region, where the procedure manual is arranged, to the HMD 100D.

In Step S516, the data receiving unit 111D of the HMD 100D stores the received identification number and the background color in the procedure manual region number 123D and the background color 126, respectively.

Fifth Embodiment: Display Source Image Generation Process

Figure 38:
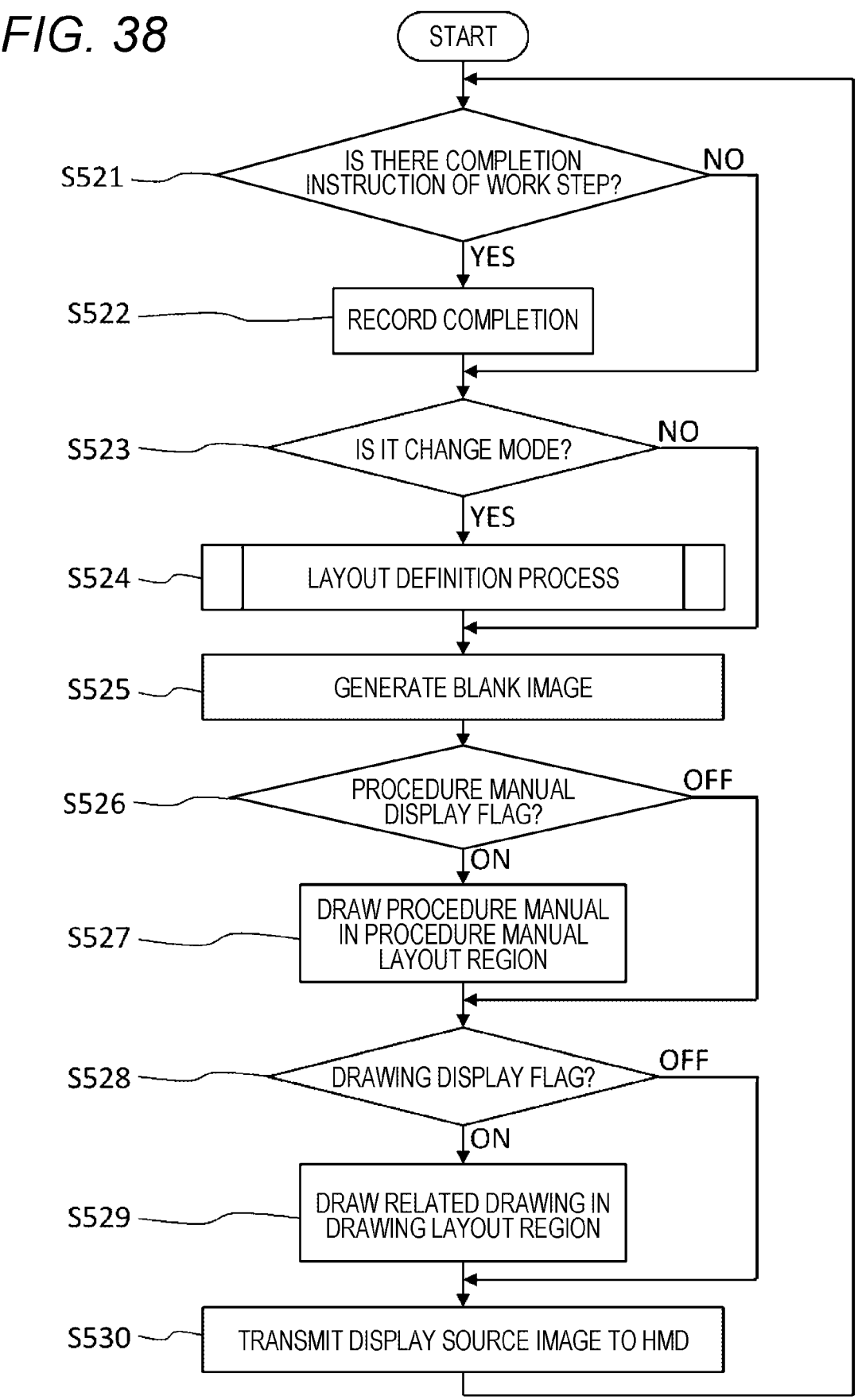
FIG. 38 is a flowchart of a display source image generation process according to the fifth embodiment.

FIG. 38 is a flowchart of the display source image generation process according to the fifth embodiment. A process in which the smartphone 200D generates the display source image 230 and transmits it to the HMD 100D will be described with reference to FIG. 38.

Steps S521 to S522 are the same processes as Steps S131 to S132.

In Step S523, if the display state of the touch panel display 281 is the change mode (see FIG. 39 described later), the display source image generation unit 212D proceeds to Step S524 (Step S523→YES), and if it is the non-changeable mode (see FIG. 40 described later), proceeds to Step S525 (Step S523→NO).

Figure 39:
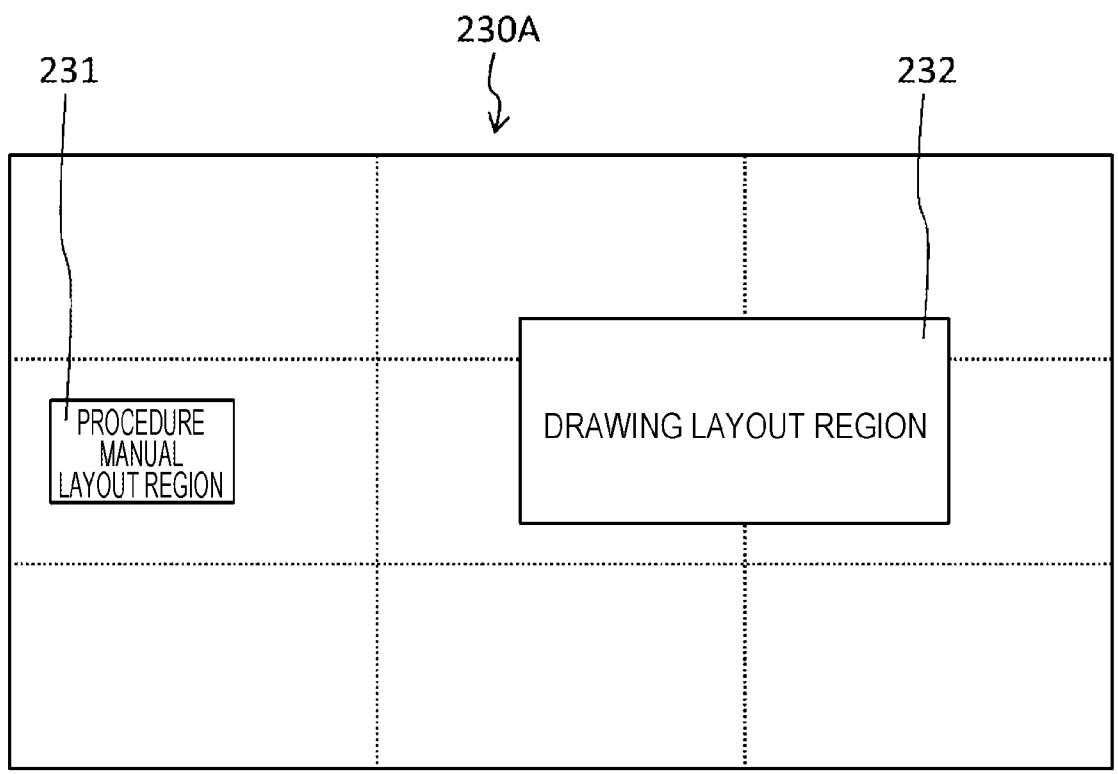
FIG. 39 is a diagram for explaining a display source image of a change mode displayed on a touch panel display according to the fifth embodiment.
Figure 40:
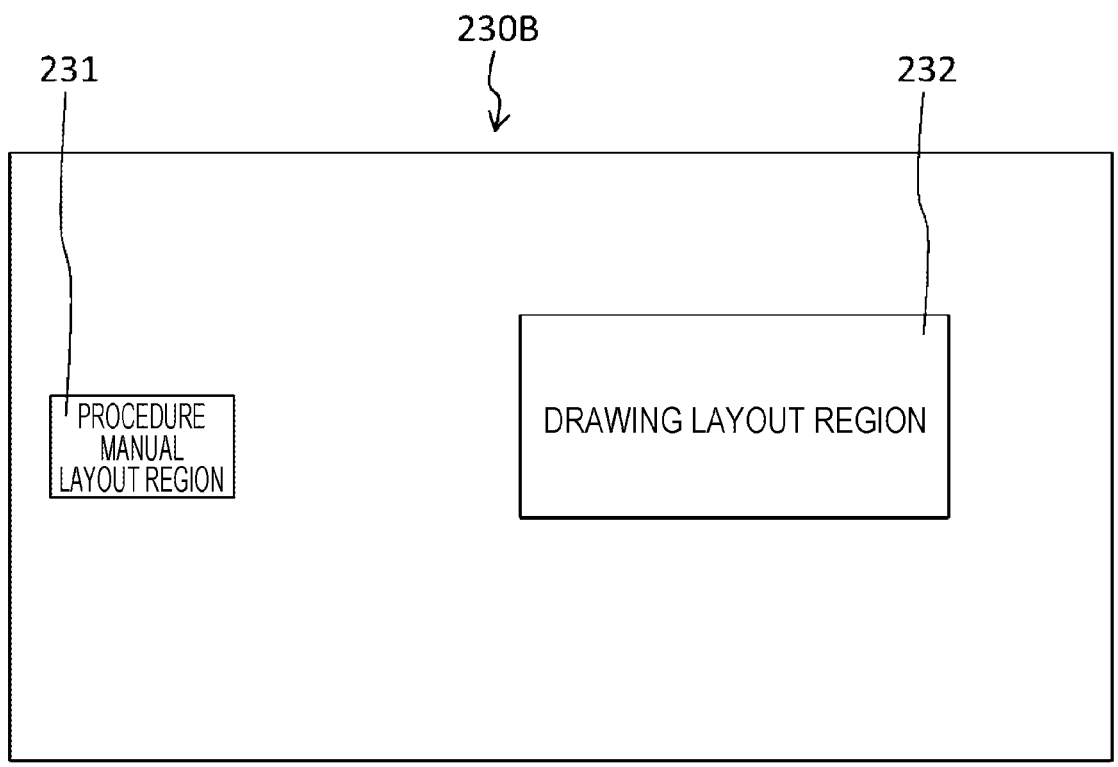
FIG. 40 is a diagram for explaining a display source image of a non-changeable mode displayed on the touch panel display according to the fifth embodiment.

FIG. 39 is a diagram for explaining a display source image 230A of the change mode displayed on the touch panel display 281 according to the fifth embodiment. FIG. 40 is a diagram for explaining a display source image 230B of the non-changeable mode displayed on the touch panel display 281 according to the fifth embodiment. The boundary of the divided display source image region is drawn as a broken line in the display source image 230A as compared to the display source image 230B. The operator can distinguish between the change mode and the non-changeable mode depending on whether this boundary is displayed. The layout definition unit 211D receives changes in the positions and sizes of the procedure manual layout region 231 and the drawing layout region 232 in the change mode.

If the operation on the touch panel display 281 is not performed within the predetermined time in the change mode, the mode shifts to the non-changeable mode. When an operation on the touch panel display 281 is detected in the non-changeable mode, the mode shifts to the change mode. The non-changeable mode may be changed to the change mode by another operation for the smartphone 200D such as voice or button operation.

Returning to FIG. 38, in Step S524, the layout definition unit 211D performs the layout definition process (see FIG. 34).

In Step S525, the display source image generation unit 212D generates a blank image having the same color as the background color 225D, and stores it in the display source image 230.

In Step S526, the display source image generation unit 212D proceeds to Step S527 if the procedure manual display flag 226 is ON (Step S526→ON), and proceeds to Step S528 if it is OFF.

In Step S527, the display source image generation unit 212D draws the procedure manual in the procedure manual layout region 231 with reference to the layout coordinates of the procedure manual layout region 231 stored in a procedure manual coordinates 222D.

In Step S528, the display source image generation unit 212D proceeds to Step S529 if the drawing display flag 226A is ON (Step S528→ON), and proceeds to Step S530 if it is OFF.

In Step S529, the display source image generation unit 212D draws the related drawing in the drawing layout region 232 with reference to the layout coordinates of the drawing layout region 232 stored in the related drawing coordinates 223D.

In Step S530, the display source image generation unit 212D transmits the display source image 230 to the HMD 100D, and returns to Step S521.

Fifth Embodiment: Field Image Display Process

Figure 41:
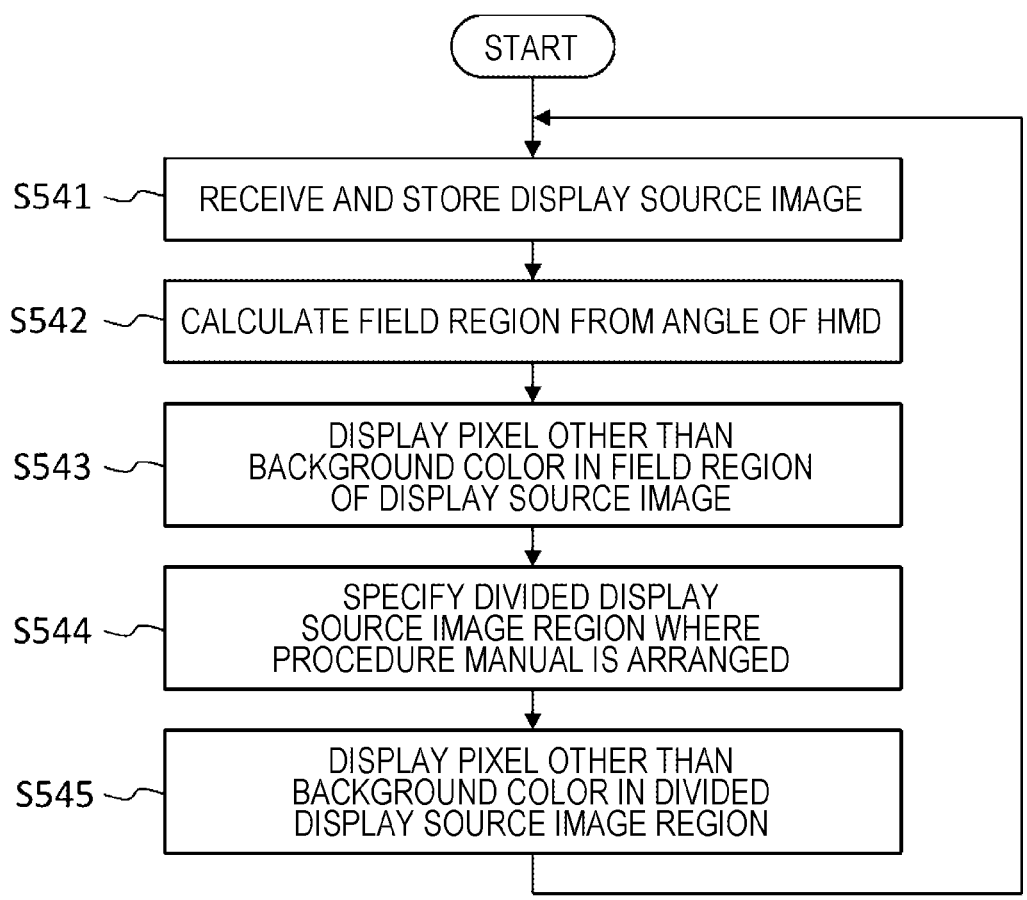
FIG. 41 is a flowchart of a field image display process according to the fifth embodiment.

FIG. 41 is a flowchart of the field image display process according to the fifth embodiment. A process in which the HMD 100D generates a field image from the display source image 122D and displays it on the display 181 will be described with reference to FIG. 41.

In Step S541, the data receiving unit 111D of the HMD 100D receives the display source image 230 transmitted by the smartphone 200D and stores it in the display source image 122D (see FIG. 28).

In Step S542, the field image display unit 112D of the HMD 100D calculates the field region 233 (see FIG. 5) from the orientation (angle) of the HMD 100 acquired by the sensor 182.

In Step S543, the field image display unit 112D displays pixels other than the background color 126 in the field region 233 from the display source image 230 on the display 181.

In Step S544, the field image display unit 112D refers to the procedure manual region number 123D and the layout region table 130 (see FIG. 30) to specify the divided display source image region in which the procedure manual in the display source image 230 stored in the display source image 122D is arranged. In this explanation, since the procedure manual region number 123D is 4, the coordinates of the divided display source image region are (0, b) and the sizes are (a, b).

In Step S545, the field image display unit 112D displays pixels other than the background color 126 in the divided display source image region specified in Step S544 on the display 181. The position where the pixel is displayed in the display 181 is the same as the position of the pixel in the divided display source image region. In other words, the field image display unit 112D regards the divided display source image region specified in Step S544 as the field region, and displays pixels other than the background color 126 on the display 181. The field image display unit 112D may superimpose the divided display source image region and the field region calculated in Step S542 by using an alpha blending method.

Fifth Embodiment: Features of Display System

Compared to the first embodiment, the second embodiment, and the fourth embodiment, in the fifth embodiment, the divided display source image region in which the procedure manual is arranged can be specified, so that the usability of the display system is improved. In addition, the HMD 100D can specify the region of the procedure manual by receiving only the identification number and the background color of the divided display source image region where the procedure manual is arranged from the smartphone 200D (see Step S515 in FIG. 34). Therefore, the amount of data exchanged with the smartphone 200D can be reduced, the configuration of the HMD 100D can be simplified, and the development cost can be reduced.

If the background color is fixed, it is not necessary to set the background color (see Step S512 in FIG. 34). Then, the transmission of the background color in Step S515 becomes unnecessary, and the amount of data can be further reduced and the development cost can be further reduced.

Figure 42:
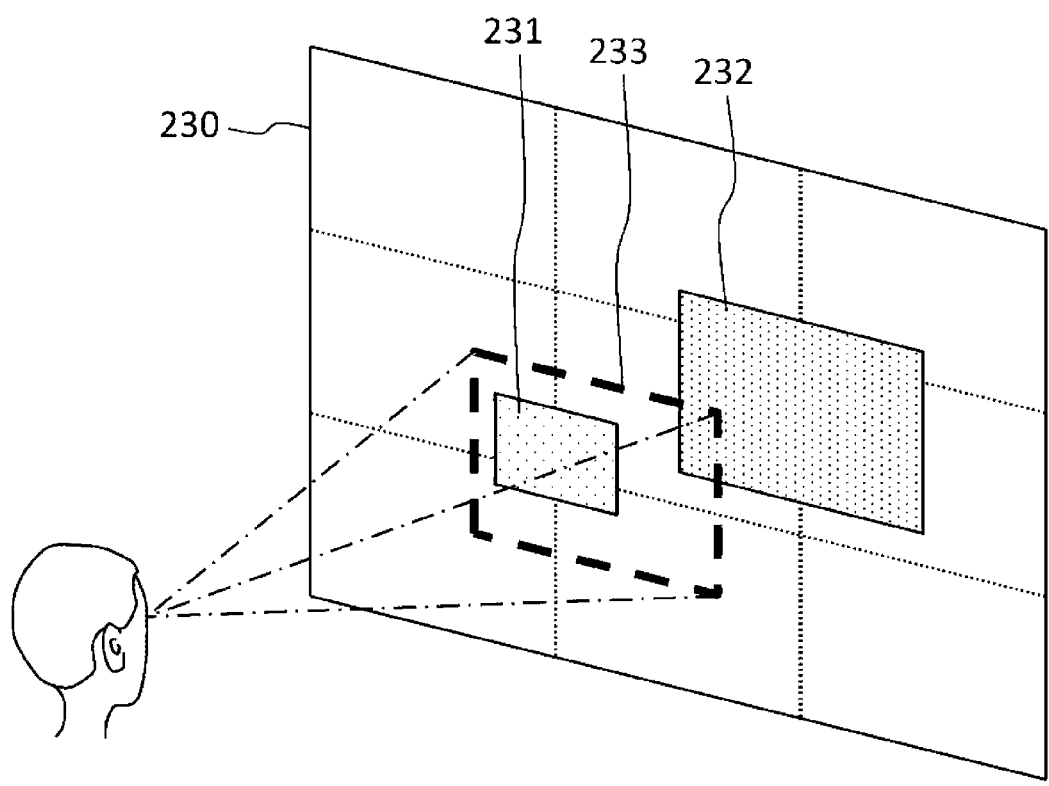
FIG. 42 is a diagram illustrating how a screen displayed on the display looks to an operator wearing the HMD according to the fifth embodiment.

FIG. 42 is a diagram illustrating how the screen displayed on the display 181 looks to the operator wearing the HMD 100D according to the fifth embodiment. The screen displayed on the display 181 is the field region 233 (see FIG. 5) in the display source image 230, and its aspect ratio is the same as that of the display source image 230.

If the procedure manual display flag 226 is ON, the procedure manual is always displayed on the display 181 (see Step S545 in FIG. 41). On the other hand, the parts of the related drawings are differently displayed depending on the orientation of the operator (HMD 100D). In FIG. 42, the display 181 displays a lower left portion of the related drawing (the field region 233 includes a lower left portion of the drawing layout region 232).

Figure 43:
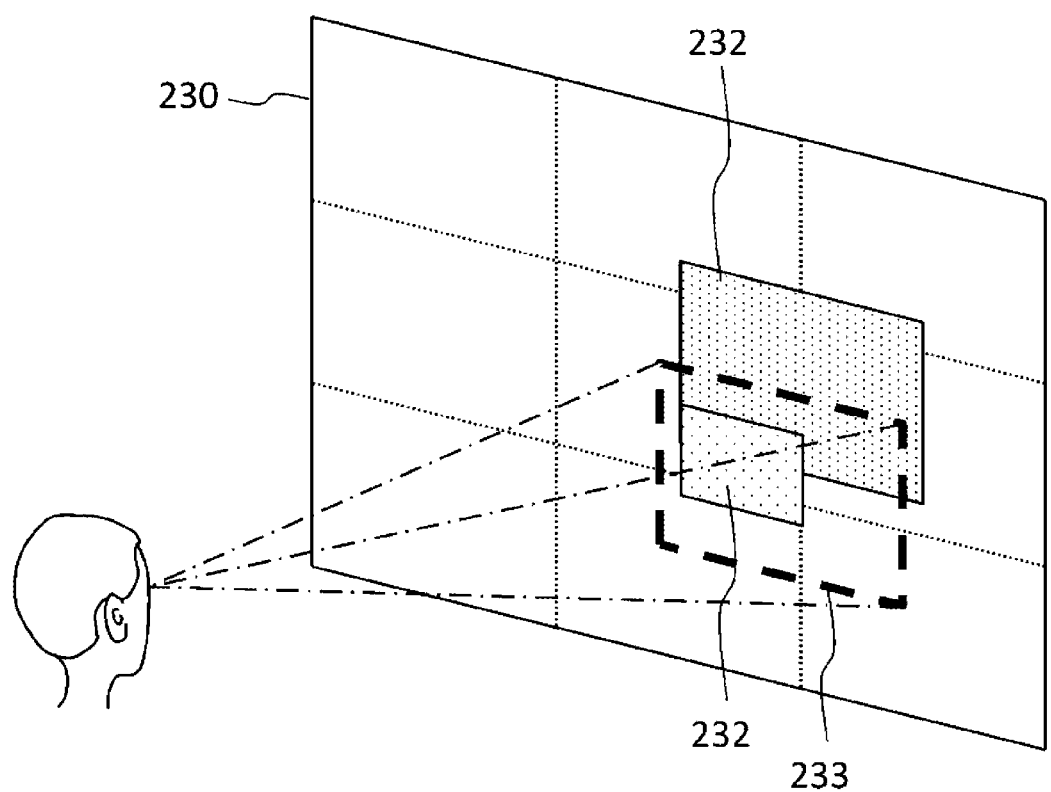
FIG. 43 is a diagram illustrating how a screen displayed on the display looks when the operator wearing the HMD according to the fifth embodiment turns to the right.

FIG. 43 is a diagram illustrating how a screen displayed on the display 181 looks when the operator wearing the HMD 100D according to the fifth embodiment turns to the right. When the operator turns to the right, the field region 233 moves to the right in the display source image 230. As a result, the lower half of the drawing in the drawing layout region 232 is included in the field region 233, and the operator can see the lower half of the drawing. The procedure is always displayed and is displayed before the drawing (above the drawing).

As described above, the procedure manual with high reference frequency is always displayed, and the related drawing with low reference frequency can control the visible range by the movement of the operator's head. Therefore, the usability of the display system is improved, and the work efficiency of the operator is improved. When the procedure manual and the related drawing overlap, the operator specifies ON/OFF of the procedure manual display flag or the drawing display flag (see Step S513 in FIG. 34), so that either one is displayed with priority (see Steps S526 to S529 in FIG. 38). Therefore, the visibility of the procedure manual, the drawing, and the work site is improved.

<<Modification: Specifying Work Steps>>

In the above-described embodiment, it is premised that the work steps are performed in the order of step number 241 (see FIG. 4), and the work proceeds to the next work step in response to the instruction to complete the work (see Step S131 in FIG. 8). The operator may specify the step number, and the smartphone 200 may generate a display source image including the work procedure manual and drawing of the specified step number and send it to the HMD.

<<Modification: Battery Status of HMD>>

In the fourth embodiment, the battery status of the smartphone 200C is displayed on the display 181. The field image display unit 112C may acquire and display the battery status of the HMD 100C instead of the battery status of the smartphone 200C.

<<Modification: Background Color>>

In the second embodiment, the related drawing is an image composed of pixels other than the background color in the display source image. On the contrary, the color of the pixels constituting the related drawing may be specified, and the image composed of the pixels of the color may be used as the related drawing. Multiple colors may be set.

<<Modification: Completion Record>>

The display system of the above-described embodiment records the completion date and time 246 (see FIG. 4) as the completion record of the work step. The image or video captured by the camera 183 of the HMD (see FIG. 20) may be recorded along with the completion date and time. Alternatively, according to the instruction of the operator, the smartphone may instruct the HMD to acquire the captured image of the camera 183 and store it in association with the current work step. By doing so, in addition to the date and time, the photograph after the work can be easily recorded, and a trail of the work can be left.

<<Modification: Divided Display Source Image Region and Procedure Manual Layout Region>>

In the fifth embodiment described above, the procedure manual layout region is included in one divided display source image region. The procedure manual layout region may be included in a plurality of divided display source image regions. For example, the display source image may be divided into 10×10 divided display source image regions, and the 2×2 divided display source image region may be used as the procedure manual layout region.

OTHER MODIFICATIONS

Although some embodiments of the invention have been described above, these embodiments are merely examples and do not limit the technical scope of the invention. For example, the above-mentioned display system is composed of an HMD and a smartphone, but the HMD and the smartphone may be integrated. Further, although the work completion instruction is given by voice, the instruction may be given by a button provided on the HMD, and the HMD may notify the smartphone that the button has been operated. Although the smartphone stores the procedure manual and drawing, it may acquire the procedure manual and drawing from a device different from the smartphone via a communication line.

The invention can take various other embodiments, and various modifications such as omission and substitution can be made without departing from the gist of the invention. Such embodiments or modifications fall within the scope and spirit of the invention described in this specification and are included in the scope of the invention described in accompanying claims and their equivalents.

What is claimed is:

1. A display apparatus, comprising:
    a detector that detects an orientation of a main unit;
    a display;
    an image display processing unit that displays a first image in a predetermined first display region on a screen of the display, and displays a second image related to the first image in a second display region on the screen of the display,
    wherein the image display processing unit determines the second display region on the screen of the display according to the orientation of the main body; and
    a data receiving unit that receives an image from a device,
    wherein the first image and the second image are partial images of a display source image which is received by the data receiving unit.

2. The display apparatus according to claim 1,
    wherein each of the partial images is in a region of a predetermined position of the display source image.

3. The display apparatus according to claim 1,
    wherein the partial image is an image composed of pixels of a predetermined color included in the display source image, or an image composed of pixels different from the predetermined color included in the display source image.

4. The display apparatus according to claim 1,
    wherein the display source image includes a second source image including the second image, and
    wherein the second display region is a region in which a field region that moves in the display source image according to the orientation of the main body and the second source image overlap.

5. The display apparatus according to claim 1,
wherein the display apparatus is a display apparatus to be worn on a head,
wherein the first image is a work procedure manual performed by a wearer of the display apparatus, and
wherein the second image is a drawing related to the procedure manual.

6. The display apparatus according to claim 1,
wherein the first display region is included in at least one divided display source image region among divided display source image regions which are display source images divided into a plurality of regions.

7. A display system, comprising:
a display apparatus; and
a portable device,
wherein the portable device includes
a display source image generation unit that generates a display source image including a first source image and a second source image related to the first source image to transmit the display source image to the display apparatus,
wherein the display apparatus includes
a detector that detects an orientation of a main body,
a display, and
an image display processing unit that displays the first source image in a predetermined first display region on a screen of the display, and displays a partial image of the second source image or the second source image in a second display region on the screen of the display, and
wherein the image display processing unit determines the second display region on the screen of the display according to the orientation of the main body.

8. The display system according to claim 7,
wherein, when the portable device detects an instruction from a user of the display system, at least one of the first source image or the second source image is replaced with another image.

9. The display system according to claim 8,
wherein the display apparatus includes an imaging device, and
wherein, when the portable device detects the instruction, the portable device acquires an image captured by the imaging device and stores the image in association with the first source image and the second source image.

10. The display system according to claim 7, further comprising:
a remote terminal,
wherein, when the portable device receives a message from the remote terminal, the display source image generation unit sets an image of the message as the first source image.

11. The display system according to claim 10,
wherein the display apparatus includes an imaging device,
wherein the image display processing unit transmits an image captured by the imaging device to the portable device, and
wherein the portable device transmits a received image to the remote terminal.

12. The display system according to claim 7,
wherein the first display region is included in at least one divided display source image region among divided display source image regions which are display source images divided into a plurality of regions.

13. A display method of a display apparatus that includes a detector for detecting an orientation of a main body and a display, the display method comprising:
displaying a first image in a predetermined first display region on a screen of the display and displaying a second image related to the first image in a second display region on the screen of the display; and
determining the second display region on the screen of the display according to the orientation of the main body; and
receiving, by a data receiving unit, an image from a portable device, wherein the first image and the second image are partial images of a display source image which is received by the data receiving unit.

\* \* \* \* \*